(12) United States Patent
He

(10) Patent No.: US 12,017,146 B2
(45) Date of Patent: Jun. 25, 2024

(54) UPDATING VIRTUAL OBJECT FRAME IMAGES CORRESPONDING TO VARIABLES

(71) Applicant: Tencent Technology (Shenzhen) Company Limited, Shenzhen (CN)

(72) Inventor: Huan He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 194 days.

(21) Appl. No.: 17/671,968

(22) Filed: Feb. 15, 2022

(65) Prior Publication Data

US 2022/0168649 A1   Jun. 2, 2022

Related U.S. Application Data

(63) Continuation of application No. PCT/CN2020/123627, filed on Oct. 26, 2020.

(30) Foreign Application Priority Data

Jan. 13, 2020   (CN) .......................... 202010033046.9

(51) Int. Cl.
A63F 13/358   (2014.01)
A63F 13/56   (2014.01)
(Continued)

(52) U.S. Cl.
CPC ............ *A63F 13/60* (2014.09); *A63F 13/358* (2014.09); *A63F 13/56* (2014.09); *A63F 13/57* (2014.09)

(58) Field of Classification Search
None
See application file for complete search history.

(56) References Cited

U.S. PATENT DOCUMENTS

| 2010/0241692 A1 | 9/2010 | Klee et al. | |
| 2012/0190444 A1* | 7/2012 | Fujisawa | A63F 13/55 463/31 |
| 2014/0235348 A1 | 8/2014 | Liang et al. | |

FOREIGN PATENT DOCUMENTS

| CN | 106512402 A | 3/2017 |
| CN | 106991713 | 7/2017 |

(Continued)

OTHER PUBLICATIONS

Extended European Search Report for EP Application No. 20914236.3 dated Aug. 23, 2022 (13 pages).

(Continued)

*Primary Examiner* — Damon J Pierce
(74) *Attorney, Agent, or Firm* — Crowell & Moring LLP

(57) ABSTRACT

Embodiments of this application disclose a data processing method, performed by a computer device, and including: obtaining an associated virtual object associated with a main virtual object and obtaining a variable pertaining to a first update frequency type among character variables of the associated virtual object as a first-type variable; compressing the first-type variable to obtain compressed data and encapsulating the compressed data to obtain first change data of the main virtual object; and transmitting the first change data of the main virtual object to a target client where the main virtual object is located, so that the target client performs frame image update and display based on the first change data.

20 Claims, 10 Drawing Sheets

(51) Int. Cl.
*A63F 13/57* (2014.01)
*A63F 13/60* (2014.01)

(56) References Cited

FOREIGN PATENT DOCUMENTS

| | | |
|---|---|---|
| CN | 107911374 A | 4/2018 |
| CN | 110404262 A | 11/2019 |
| CN | 111228797 A | 6/2020 |
| JP | 2005 011346 A | 1/2005 |
| JP | 2012-143408 | 8/2012 |
| KR | 10-2015-0114909 | 10/2015 |

OTHER PUBLICATIONS

"Source Multiplayer Networking—Valve Developer Community", Oct. 16, 2011, https://developer.valvesoftware.com/w/index.php?title=Source_Multiplayer_Networking&oldid=161213 (7 pages).

Cai W et al: "An Auto-adaptive Dead Reckoning Algorithm for Distributed Interactive Simulation", Proceedings 13th. Workshop on Parallel and Distributed Simulation. (PADS'99). Atlanta, GA, May, 1-4, 1999; [Proceedings of the Workshop on Parallel and Distributed Simulation. (PADS)], Los Almitos, CA: IEEE Comp. Soc, US, May 1, 1999 (May 1, 1999), pp. 82-89, XP002345088, ISBN: 978-0-7695-0157-4 (8 pages).

Vlad Nae et al: "Dynamic Resource Provisioning in Massively Multiplayer Online Games", IEEE Transactions on Parallel and Distributed Systems, IEEE, USA, vol. 22, No. 3, Mar. 1, 2011 (Mar. 1, 2011), pp. 380-395, (16 pages).

International Search Report and Written Opinion for International Application No. PCT/CN2020/123627 mailed January 29, 2021 including translation of International Search Report (11 pages).

Chinese Office Action for Chinese Patent Application No. 2020100330469 dated Dec. 18, 2020, including an English Concise Explanation (11 pages).

Notification of reasons for refusal for Japanese Patent Application No. 2022-519177 dated Apr. 4, 2023 including translation (10 pages).

Source Multiplayer Networking, Valve Developer Community [online], 2 Jan. 1, 2002, URL: <https://web.archive.org/web/20200101114446/https://developer.valvesoftware.com/wiki/Source_Multiplayer_Networking>, [Reiwa 5 Search date Mar. 30, 2020].

Korean Office Action for Korean Patent Application 10-2022-7007045 dated Jan. 11, 2024, including an English translation (10 pages).

\* cited by examiner

UPDATING VIRTUAL OBJECT FRAME IMAGES CORRESPONDING TO VARIABLES

RELATED APPLICATION

This application is a continuation of International Patent Application No. PCT/CN2020/123627, filed Oct. 26, 2020, which claims priority to Chinese Patent Application No. 202010033046.9, entitled "DATA PROCESSING METHOD, DATA PROCESSING APPARATUS, COMPUTER DEVICE, AND READABLE STORAGE MEDIUM" filed on Jan. 13, 2020. The contents of International Patent Application No. PCT/CN2020/123627 and Chinese Patent Application No. 202010033046.9 are each incorporated by reference in their entirety.

FIELD OF THE TECHNOLOGY

This application relates to the field of computer technologies, and in particular, to a data processing method, a data processing apparatus, a computer device, and a readable storage medium.

BACKGROUND OF THE DISCLOSURE

In a network game, especially in an on-line First Person Shooter (FPS) game, the theme logic of the game is run on a server, including a moving location of each Non-Player-Character (NPC), a location and state of each player, or the like. These data are to be selected and filtered, and transmitted to each game client by using a method of "data replication". The game client may receive the corresponding data, render the received data, and display the rendered data on a client screen.

However, data processing takes a specific amount of time due to that related data that the server needs to process is relatively large, further, the network bandwidth is limited, and in addition, line of sight of client players are limited; therefore, generally, the server may use a nine squares partition method to transmit changes of related data around a player to a client of the player, such as related data within approximately 200 meters from a player in most FPS games.

However, for a game with a large number of NPCs and players on a map, in a case that data processing is performed for the client by using the foregoing data synchronization method, it is necessary to compare current data of each game object (including NPCs and players) with data during previous updating, to obtain a change record of each game object, and in addition, there are many game objects to be updated and each game object includes a large amount of data; this goes beyond the performance of the server. Further, data comparison of game objects and arrangement of change records may also consume a large amount of time. Consequently, an overhead of data replication of game objects may reach 40 milliseconds or even more during updating of each frame, resulting in a low data updating efficiency of the server.

SUMMARY

Embodiments of this application provide a data processing method, a data processing apparatus, a computer device, and a computer-readable storage medium, which can improve the efficiency of data processing.

An aspect of the embodiments of this application provides a data processing method, performed by a computer device, the method including:

obtaining an associated virtual object associated with a main virtual object and obtaining a variable pertaining to a first update frequency type among character variables of the associated virtual object as a first-type variable;

compressing the first-type variable to obtain compressed data and encapsulating the compressed data to obtain first change data of the main virtual object; and transmitting the first change data of the main virtual object to a target client where the main virtual object is located, so that the target client performs frame image update and display based on the first change data.

An aspect of the embodiments of this application provides a data processing apparatus, the apparatus including:

a first obtaining module, configured to obtain an associated virtual object associated with a main virtual object and obtain a variable pertaining to a first update frequency type among character variables of the associated virtual object as a first-type variable;

a compressing module, configured to compress the first-type variable to obtain compressed data;

a first encapsulating module, configured to encapsulate the compressed data to obtain first change data of the main virtual object; and a first transmitting module, configured to transmit the first change data of the main virtual object to a target client where the main virtual object is located, so that the target client performs frame image update and display based on the first change data.

An aspect of the embodiments of this application provides a computer device, including: a processor, a memory, and an input/output interface;

the processor being coupled to the memory and the input/output interface, the input/output interface being configured to input data and output data, the memory being configured to store program code, and the processor being configured to invoke the program code to perform the foregoing data processing method in the embodiments of this application.

An aspect of the embodiments of this application provides a computer-readable storage medium, storing a computer program, the computer program including program instructions, the program instructions, when run by a processor, performing the foregoing data processing method in the embodiments of this application.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

The technical solutions in the embodiments of this application are clearly described in the following with reference to the accompanying drawings. Apparently, the embodiments to be described are merely a part rather than all of the embodiments of this application. All other embodiments obtained by a person of ordinary skill in the art based on the embodiments of this application without creative efforts shall fall within the protection scope of this application.

Figure 1:
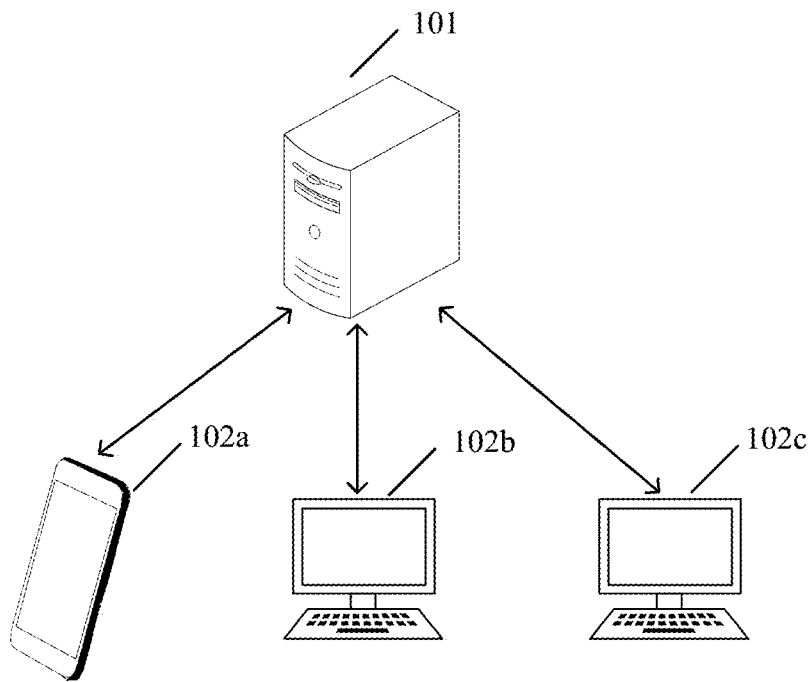
FIG. 1 is a diagram of a data processing frame according to an embodiment of this application.

Further, referring to FIG. 1, FIG. 1 is a diagram of a data processing frame according to an embodiment of this application. As shown in FIG. 1, a data processing system includes a computer device 101 and a plurality of electronic devices, such as an electronic device 102*a*, an electronic device 102*b*, an electronic device 102*c*, and the like. The computer device 101 may be communicatedly connected to the electronic devices. Further, the computer device 101 obtains related data of each electronic device connected thereto, generates change data corresponding to each electronic device, and transmits generated change data to the corresponding electronic device, so that the electronic device performs frame image update and display based on the corresponding change data. The electronic device 102*a* is used as an example. The computer device 101 detects that the electronic device 102*a* is on line and obtains an associated virtual object associated with a main virtual object logged in the electronic device 102*a*. The associated virtual object includes a player or an NPC associated with the main virtual object and may be considered to be an object displayed in the electronic device 102*a* where the main virtual object is located. A first-type variable of each associated virtual object, such as location information, visual field direction information, speed information, acceleration information, path information, and Ragdoll information corresponding to the associated virtual object, is obtained. The Ragdoll information is used for building a character model of the associated virtual object. The first-type variable is a variable that is of the associated virtual object and pertains to a first update frequency type. The first update frequency type may be considered as a frequency that is changed every frame. Because the first-type variable is changed frequently, the first-type variable needs to be updated during updating of each frame. Therefore, the computer device needs to obtain the first-type variable of the associated virtual object during data processing, so as to keep data in a display page of a target client to be consistent with data in the computer device, thereby implementing data replication of the first-type variable. During the data replication for the first-type variable, each first-type variable may be compressed, to obtain compressed data, including compressed data of location information, compressed data of visual field direction information, compressed data of path information, or the like. The generated compressed data is encapsulated into first change data of the main virtual object, and the first change data is transmitted to the electronic device 102*a*. The electronic device 102*a* is a target client where the main virtual object is located. By compressing the first-type variable, the amount of data to be transmitted between the computer device and the client is reduced and the updating efficiency is improved. For a variable other than the first-type variable, such as a second-type variable, the second-type variable does not need to be processed every frame because the second-type variable is a variable pertains to a second update frequency type and second update frequency type indicates that the update frequency is relatively low and that a change may not occur every frame, thereby further reducing the amount of data to be processed by the computer device and the amount of data to be transmitted between the computer device and the client, and improving the updating efficiency.

After receiving the first change data, the electronic device 102*a* restores first change data to obtain first-type variables, such as the location information, the visual field direction information, the speed information, the acceleration information, the path information, and the Ragdoll information corresponding to the associated virtual object, and a current frame image is rendered based on these first-type variables. It may be considered that the state of a virtual object displayed in the current frame image is determined by the first-type variables. A process in which the computer device 101 transmits change data to the electronic device 102*b*, the electronic device 102*c*, or the like is the same as the process in which the computer device 101 transmits the change data to the electronic device 102*a*. The computer device 101 may be a server or a client, or may alternatively be a system composed of a server and a client. The client may be an electronic device. The client and the electronic devices (the electronic device 102*a*, the electronic device 102*b*, the electronic device 102*c*, and the like) include, but are not limited to, a mobile phone, a tablet computer, a desktop computer, a notebook computer, a palmtop computer, a mobile internet device (MID), a wearable devices (for example, a smart watch or a smart bracelet), or the like.

It may be understood that the method provided in this embodiment of this application may be performed by a computer device, which includes, but is not limited to, a terminal or a server. Data processing in this embodiment of this application may be performed by a computer device. During applying of this embodiment of this application to a game scene, the computer device includes, but is not limited to, a dedicated server (DS). The DS is a server running game logic, does not run a task related to image rendering and sound or the like, and transmits a result of data processing to a client for processing game data.

In the game scene, by classifying character variables of an associated virtual object based on an update frequency type, a first-type variable pertaining to a high frequency (the first update frequency type) is updated during updating of each frame and the first-type variable is compressed. Moreover, a second-type variable pertaining to a low frequency (the second update frequency type) does not need to be updated every frame. Therefore, the overhead of the computer device for data replication is reduced, the frame updating efficiency is improved, and the update time of one frame in the game scene is shortened, so that the frame image updating performance of the game scene can be further improved, the switching between frames in the game scene can be smoother, and the user experience can be improved. In this embodiment of this application, data processing pressure of the computer device (for example, the DS) can be reduced, and therefore given a computer device with the same performance, a richer game scene can be implemented by a technician by using this embodiment of this application. For example, if it is assumed that the DS performs data replication on a game scene of 100 players and two frames may be replicated per second, switching between frames in the game scene is extremely slow, and therefore the experience of the game is extremely poor. Through this embodiment of this application, the data replication performance can be improved and dozens of frames, for example 40 frames, can be replicated per second, and switching dozens of frames per second falls within to an acceptable switching frequency for human eyes, so that the players may observe continuous frame image switching without jamming, thereby improving the experience of the game.

Figure 2:
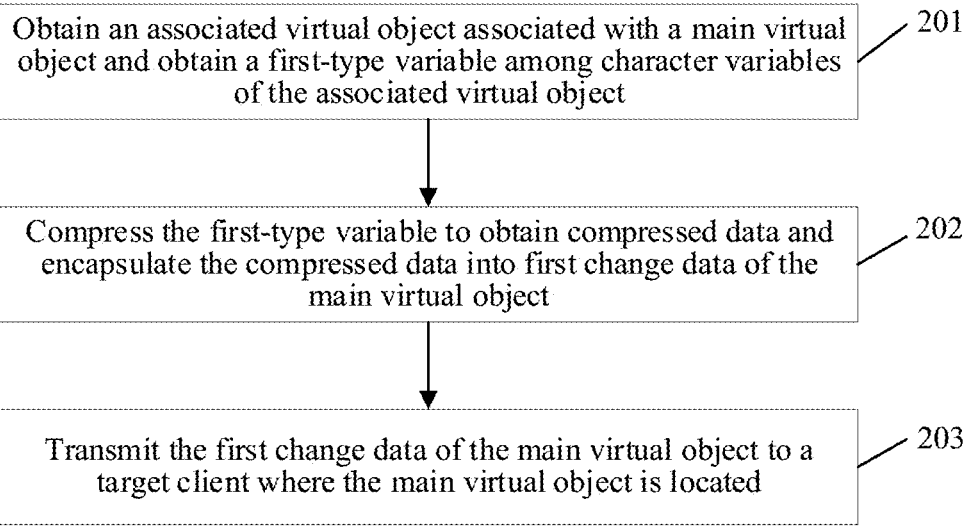
FIG. 2 is a flowchart of a data processing method according to an embodiment of this application.

Further, referring to FIG. 2, FIG. 2 is a flowchart of a data processing method according to an embodiment of this application. As shown in FIG. 2, the computer device is used as the execution body for description, and the data processing process includes the following steps:

Step S201: Obtain an associated virtual object associated with a main virtual object and obtain a first-type variable among character variables of the associated virtual object.

Further, the associated virtual object associated with the main virtual object is obtained and the variable pertaining to the first update frequency type among the character variables of the associated virtual object is obtained and used as the first-type variable. Further, an application scene may include at least one main virtual object and each main virtual object may probably be associated with at least one associated virtual object. During frame image updating of the application scene, the computer device obtains the main virtual object associated with the application scene. The main virtual object is a virtual object whose attribute category in the application scene is a user character attribute. After obtaining the main virtual object, the computer device obtains the associated virtual object associated with the main virtual object. The associated virtual object associated with the main virtual object may not be unique, and each associated virtual object includes character variables, which constitute a display state that is of the corresponding associated virtual object in the application scene and that is used for displaying the associated virtual object in the application scene. One associated virtual object is used as an example. A variable pertaining to the first update frequency type among the character variables of the associated virtual object is obtained and used as the first-type variable of the associated virtual object. The first update frequency type may indicate an update frequency type in which a change occurs every frame, or indicate an update frequency type in which the update frequency is greater than or equal to a first update frequency threshold, or the like.

Figure 3:
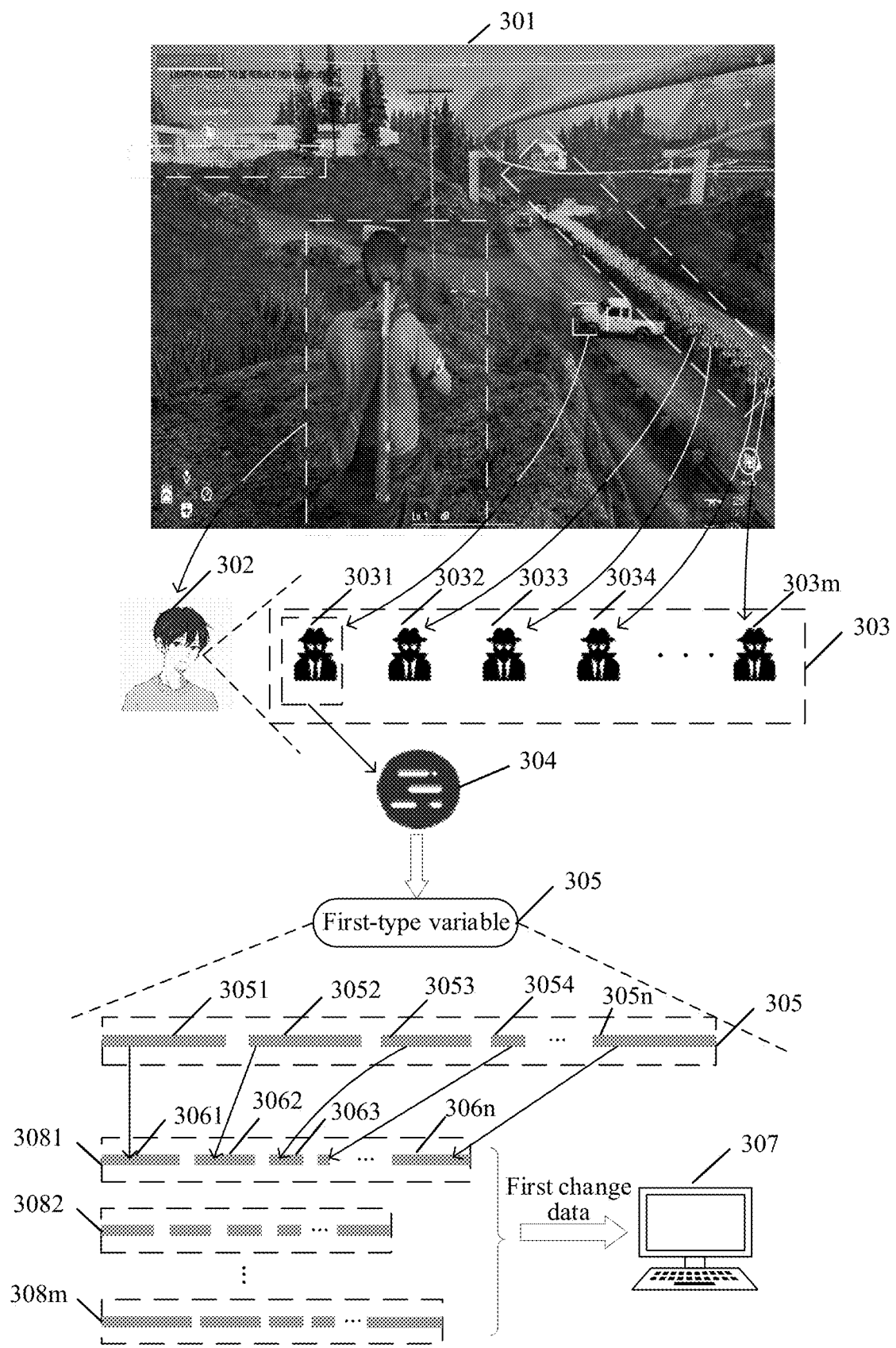
FIG. 3 is a schematic diagram of a data processing process of a first-type variable according to an embodiment of this application.

Further, referring to FIG. 3, FIG. 3 is a schematic diagram of a data processing process of a first-type variable according to an embodiment of this application. In the application scene, the computer device obtains the main virtual object in the application scene, obtains the associated virtual object associated with the main virtual object and obtains the first-type variable among the character variables of the associated virtual object. As shown in FIG. 3, if it is assumed that the application scene is a game scene, an application scene 301 includes a plurality of virtual objects, and an attribute category of each virtual object is a user character attribute or a system character attribute. In one case, it may be considered that a virtual object whose attribute category is the user character attribute is a player character, and a virtual object whose attribute category is the system character attribute is a Non-Player-Character (NPC). The virtual object whose attribute category is the user character attribute in the application scene 301 is obtained, and the virtual object whose attribute category is the user character attribute is determined as the main virtual object. A main virtual object 302 in the application scene 301 is used as an example to describe the data processing process in this embodiment of this application. The main virtual object 302 may indicate a virtual object displayed in the application scene 301 and may also indicate a virtual account for manipulating the virtual object. The main virtual object 302 corresponds to a client, which is configured to display a frame image in the application scene 301 by using the corresponding main virtual object 302 as a main vision. In other words, for the same application scene, displayed frame images may not be the same during displaying of the frame images with different main virtual objects as the main vision, because visual ranges of the different main virtual objects are different.

Further, in FIG. 3, a set of associated virtual objects 303 associated with the main virtual object 302 is obtained. The set of associated virtual object 303 includes at least one associated virtual object, such as an associated virtual object 3031, an associated virtual object 3032, an associated virtual object 3033, an associated virtual object 3034, . . . , and an associated virtual object 303$m$ (m is a positive integer and m is a quantity of associated virtual objects associated with the main virtual object). Each associated virtual object included in the set of associated virtual objects 303 pertains to a virtual object other than the main virtual object 302 in the application scene. The associated virtual object 3031 is used as an example. A variable pertaining to the first update frequency type among character variables 304 of the associated virtual object 3031 is obtained and used as a first-type variable 305. The first-type variable 305 is a part of the character variables 304 of the associated virtual object 3031. It is assumed that the first-type variable 305 of the associated virtual object 3031 includes at least one variable, such as a variable 3051, a variable 3052, a variable 3053, a variable 3054, . . . , and a variable 305$n$ (n is a positive integer and n is a quantity of variables included in the first-type variable 305).

Step S202: Compress the first-type variable to obtain compressed data and encapsulate the compressed data into first change data of the main virtual object.

Further, the first-type variable is compressed to obtain the compressed data and the compressed data is encapsulated into the first change data of the main virtual object. Further, the compressing the first-type variable includes, but is not limited to, encoding the first-type variable or reducing a numerical type of the first-type variable, to reduce the storage space occupied by the first-type variable and reduce the amount of data to be transmitted to a client.

Further, referring to FIG. 3, the compressing the first-type variable 305 is compressing each variable included in the first-type variable 305 to obtain compressed data 3081. The method for compressing different variables may be the same or different, which is not limited herein. Further, in the first-type variable 305, the variable 3051 is compressed to obtain compressed data 3061 corresponding to the variable 3051; the variable 3052 is compressed to obtain compressed data 3062 corresponding to the variable 3052; . . . ; and the variable 305n is compressed to obtain compressed data 306n corresponding to the variable 305n. The compressed data 3061, the compressed data 3062, . . . , and the compressed data 306n form the compressed data 3081 corresponding to the first-type variable 305. Similarly, the first-type variable of the associated virtual object 3032 is compressed to obtain compressed data 3082; the first-type variable of the associated virtual object 3033 is compressed to obtain compressed data 3083; . . . ; and the first-type variable of the associated virtual object 303m is compressed to obtain compressed data 308m. The compressed data 3081 corresponding to the associated virtual object 3031, the compressed data 3082 corresponding to the associated virtual object 3032, . . . , and the compressed data 308m corresponding to the associated virtual object 303m are encapsulated to obtain the first change data.

Step S203: Transmit the first change data of the main virtual object to a target client where the main virtual object is located.

Further, the first change data of the main virtual object is transmitted to the target client where the main virtual object is located, so that the target client performs frame image update and display based on the first change data. Further, the first change data is data for the target client to render the associated virtual object during displaying of this frame. Referring to FIG. 3, after generating the first change data, the computer device transmits the first change data to a target client 307 where the associated virtual object is located, so that the target client 307 may perform frame image display based on the first change data.

Figure 4:
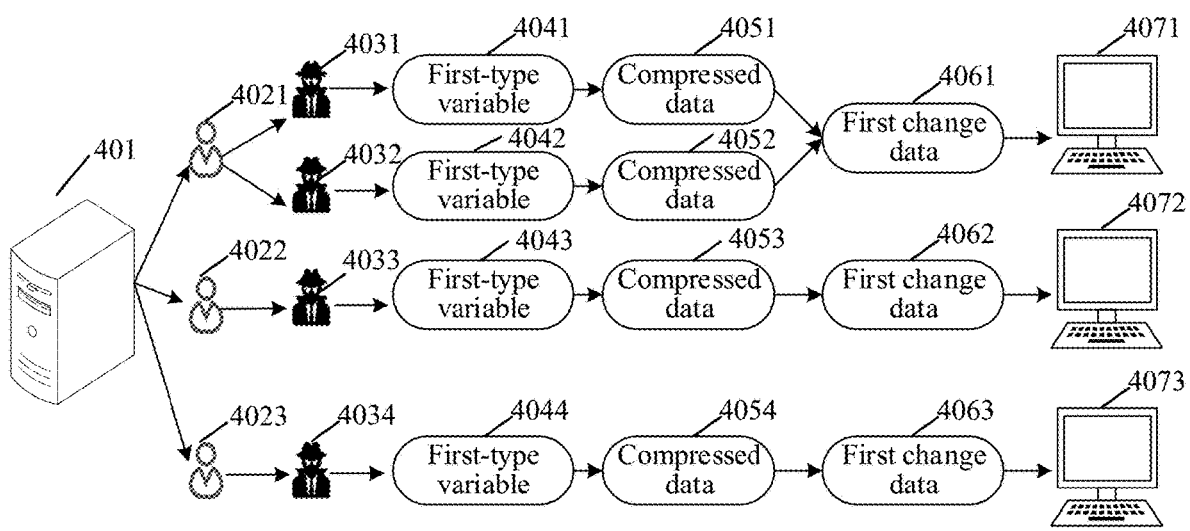
FIG. 4 illustrates a data processing process for a plurality of virtual objects according to an embodiment of this application.

In event that the application scene includes a plurality of main virtual objects, the data processing process of the main virtual object 302 is used as an example. First change data of another main virtual object in the application scene is obtained and the obtained first change data is transmitted to a target client where the corresponding main virtual object is located, so that all clients associated with the application scene may perform frame image update and display based on the received first change data. Further, referring to FIG. 4, FIG. 4 illustrates a data processing process for a plurality of virtual objects according to an embodiment of this application. As shown in FIG. 4, the application scene includes a plurality of main virtual objects and each main virtual object is associated with more than one associated virtual object. If it is assumed that a computer device 401 obtains a main virtual object 4021, a main virtual object 4022, and a main virtual object 4023 from the application scene, an associated virtual object 4031 and an associated virtual object 4032 associated with the main virtual object 4021 are obtained, a first-type variable 4041 of the associated virtual object 4031 is obtained, and the first-type variable 4041 is compressed to obtain compressed data 4051. Similarly, a first-type variable 4042 associated with the associated virtual object 4032 is obtained, and the first-type variable 4042 is compressed to obtain compressed data 4052. The compressed data 4051 and the compressed data 4052 are encapsulated into first change data 4061 and the first change data 4061 is transmitted to a target client 4071 where the main virtual object 4021 is located. Similarly, an associated virtual object 4033 associated with the main virtual object 4022 is obtained, a first-type variable 4043 of the associated virtual object 4033 is obtained, the first-type variable 4043 is compressed to obtain compressed data 4053. The compressed data 4053 is encapsulated into first change data 4062 and the first change data 4062 is transmitted to a target client 4072 where the main virtual object 4022 is located. An associated virtual object 4034 associated with the main virtual object 4023 is obtained, a first-type variable 4044 of the associated virtual object 4034 is obtained, and the first-type variable 4044 is compressed to obtain compressed data 4054. The compressed data 4054 is encapsulated into first change data 4063 and the first change data 4063 is transmitted to a target client 4073 where the main virtual object 4023 is located. Regardless of the quantity of main virtual objects obtained by the computer device from the application scene and the quantity of associated virtual objects associated with each main virtual object (one or at least two, or the like), the first change data corresponding to each main virtual object can be obtained and transmitted to the target client where the corresponding main virtual object is located by using the data processing process for a plurality of virtual objects implemented in FIG. 4.

In the embodiments of this application, through the data processing process, a computer device obtains an associated virtual object associated with a main virtual object, obtains a first-type variable of the associated virtual object, compresses first-type variable to obtain compressed data, encapsulates the compressed data into first change data, and transmits the first change data to a target client where the main virtual object is located, thereby reducing the data transmission amount during data transmission between the computer device and each target client. Through the data processing process, character variables of each associated virtual object are classified and a variable pertaining to a first update frequency type (that is, the first-type variable) is compressed. On one hand, by classifying the character variables, the amount of data to be processed by the computer device is reduced, and on the other hand, the first-type variable is compressed to reduce the amount of data to be transmitted by the computer device to the client, so as to reduce the network data processing pressure of the computer device and reduce the time consumption of data processing, thereby improving the efficiency of data processing. During applying of this embodiment of this application to a game scene, the pressure of data replication of a computer device may be reduced. The computer device includes, but is not limited to, DS. The data replication refers to a process in which the computer device transmits game data to a client, to cause the client to keep game data consistent with that of the computer device.

Figure 5:
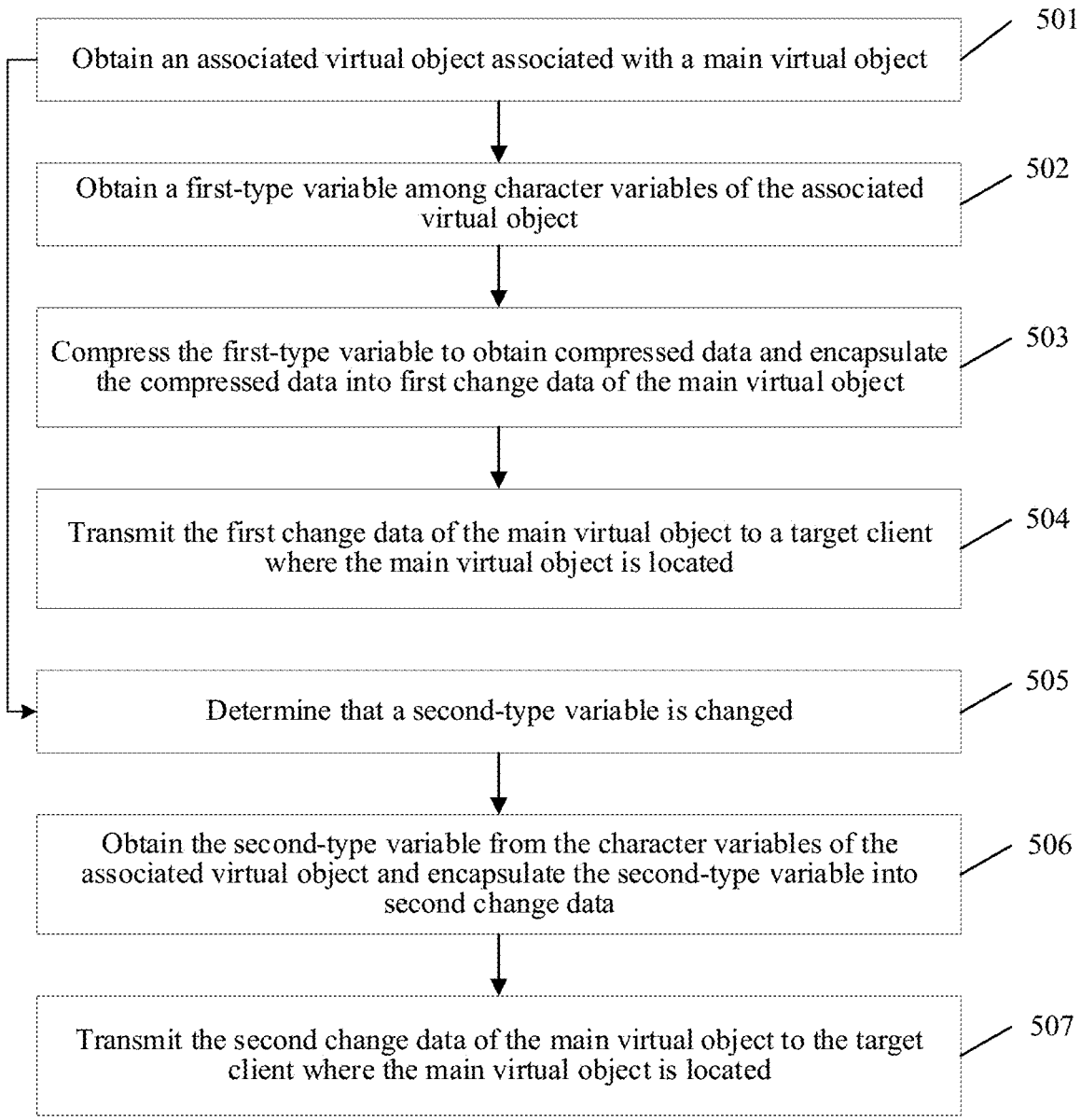
FIG. 5 is a schematic flowchart of specific data processing according to an embodiment of this application.

Further, referring to FIG. 5, FIG. 5 is a schematic flowchart of specific data processing according to an embodiment of this application. As shown in FIG. 5, the flow includes the following steps:

Step S501: Obtain an associated virtual object associated with a main virtual object.

Further, the associated virtual object associated with the main virtual object may be determined by using a visual range of the main virtual object, the associated virtual object associated with the main virtual object may also be determined by using an attribute category of the main virtual object, or the associated virtual object associated with the main virtual object may be determined in combination with the visual range and the attribute category of the main virtual object.

In event that the associated virtual object is determined by using the visual range of the main virtual object, distance information between the main virtual object and at least two raw virtual objects is obtained from a distance relationship list; a virtual object to be selected whose distance information is greater than a first distance threshold and less than or equal to a second distance threshold is obtained from the at least two raw virtual objects and line-of-sight angle information between the virtual object to be selected and visual field direction information of the main virtual object is determined; and a raw virtual object whose distance information is less than or equal to the first distance threshold or a virtual object to be selected whose line-of-sight angle information is less than a visual angle threshold is determined as the associated virtual object associated with the main virtual object, or the raw virtual object whose distance information is less than or equal to the first distance threshold and the virtual object to be selected whose line-of-sight angle information is less than the visual angle threshold may be determined as the associated virtual objects associated with the main virtual object. In other words, association between each virtual object and the main virtual object in the application scene is determined based on distance information and special logic, for example, the special logic may be "a virtual object within a minimum angle (visual range) in front of the main virtual object". The raw virtual object whose distance information with the main virtual object is less than or equal to the first distance threshold is a virtual object displayed on a display page of the target client where the main virtual object is located. The virtual object to be selected whose line-of-sight angle information is less than the visual angle threshold is a virtual object to be selected displayed on the display page of the target client where the main virtual object is located in event that the main virtual object uses a far-range prop. The virtual object to be selected may also be a raw virtual object whose distance information with the main virtual object is less than or equal to a second distance threshold. An associated virtual object associated with a player is determined by using visual ranges of the player without using the far-range prop and using the far-range prop.

The line-of-sight angle information is determined according to location information of the virtual object to be selected in the application scene and the visual field direction information of the main virtual object. The visual field direction information of the main virtual object may be a unit vector, a unit longitude and latitude, or the like. Further, an indication manner of the visual field direction information of the main virtual object is determined according to an implementation of the application scene, and is not limited herein. For example, in event that the application scene is created by using a reference point (0, 0, 0), orientation information of the main virtual object may be (x1, y1, z1), x1, y1, and z1 all being values between 0 and 1, and indicates an orientation of the main virtual object, that is, a visual field direction of the main virtual object. Location information (x2, y2, z2) of the virtual object to be selected in the application scene and location information (x3, y3, z3) of the main virtual object in the application scene are obtained. A direction vector between the virtual object to be selected and the main virtual object is obtained by using the location information (x2, y2, z2) of the virtual object to be selected and the location information (x3, y3, z3) of the main virtual object, and the line-of-sight angle information between the virtual object to be selected and the main virtual object is determined according to the direction vector and the visual field direction information of the main virtual object. The foregoing describes a possible method for determining line-of-sight angle information, and there may be other methods for obtaining line-of-sight angle information between the virtual object to be selected and the visual field direction information of the main virtual object, which is not limited herein.

For example, in a game scene, all virtual objects within a visual range of a player (the main virtual object) may be considered as associated virtual objects associated with the player, that is, raw virtual objects whose distance information with the player is less than or equal to the first distance threshold. In event that the player uses a far-range prop such as a sniper mirror and telescope to observe, the visual range of the player may be increased, and a virtual object within the visual range after the player uses the far-range prop may also be considered as an associated virtual object associated with the player. The second distance threshold is a farthest distance that the player can observe using the far-range prop, and the visual angle threshold is a maximum visual angle that the player can observe using the far-range prop.

Figure 6:
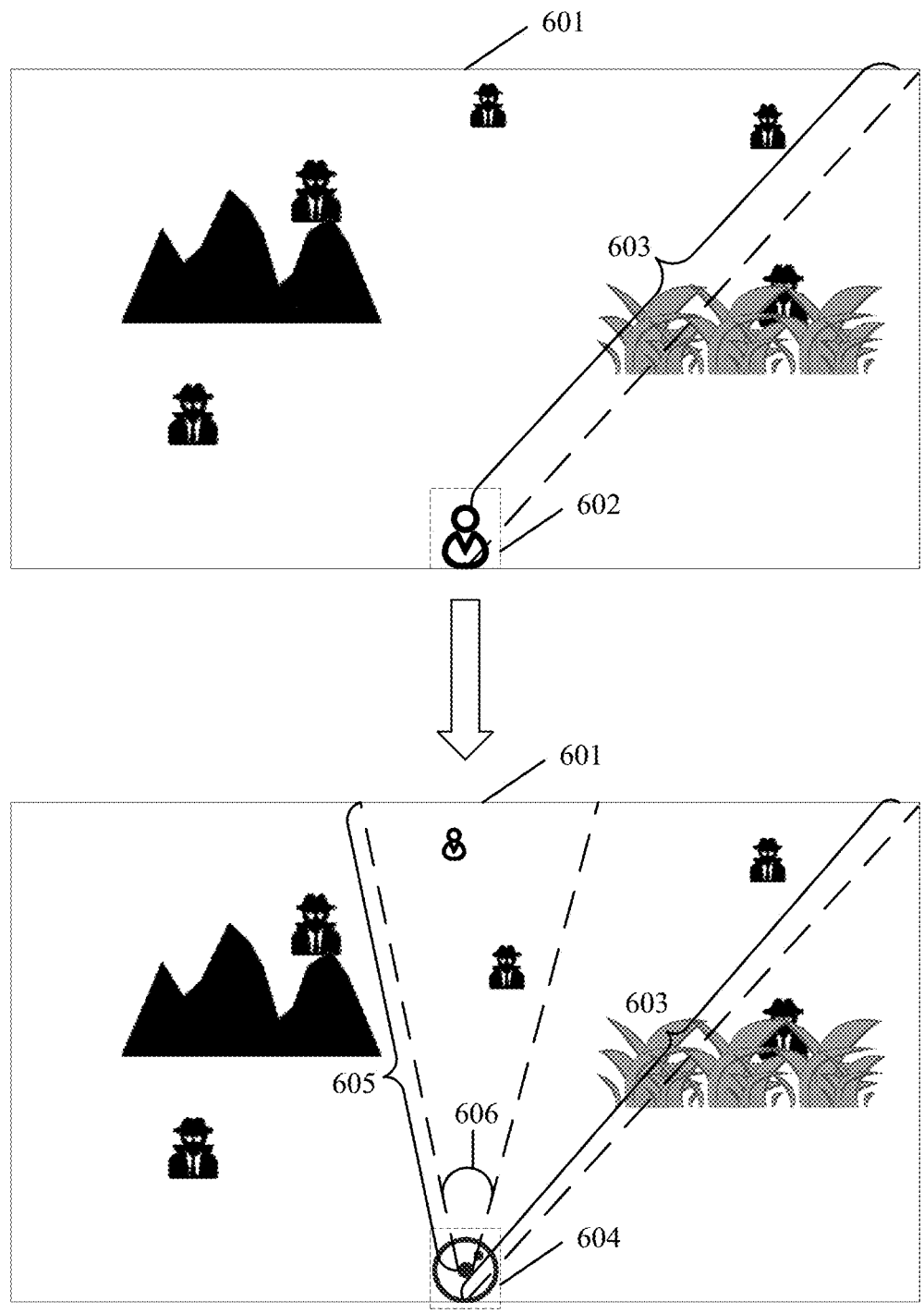
FIG. 6 is a schematic diagram of a display scene of an associated virtual object according to an embodiment of this application.

Further, referring to FIG. 6, FIG. 6 is a schematic diagram of a display scene of an associated virtual object according to an embodiment of this application. As shown in FIG. 6, it is assumed that a frame image is displayed in a display page 601 of a target client in event that a main virtual object 602 does not use a far-range prop. A raw virtual object whose distance information with the main virtual object 602 is less than or equal to a first distance threshold 603 is obtained and determined as an associated virtual object. After related information of the associated virtual object is transmitted to the target client, the target client displays the received associated virtual object on the display page 601. The associated virtual object is a virtual object except the main virtual object 602 displayed on the display page 601. In event that the target client displays the associated virtual object on the display page 601, the size of each associated virtual object displayed on the display page 601 may be adjusted according to the distance information between each associated virtual object and the main virtual object 602. In event the main virtual object 602 uses a far-range prop 604, a virtual object to be selected whose distance information is greater than the first distance threshold 603 and less than or equal to a second distance threshold 605 is obtained from at least two raw virtual objects, line-of-sight angle information between the virtual object to be selected and visual field direction information of the main virtual object 602 is determined, and a virtual object to be selected whose line-of-sight angle information is less than a visual angle threshold 606 is determined as an associated virtual object associated with the main virtual object 602. In this case, the display page 601 of the target client displays the associated virtual object whose distance information is less than or equal to the first distance threshold 603, and also displays the associated virtual object whose line-of-sight angle information is less than the visual angle threshold 606. The first distance threshold 603 and the second distance threshold 605 refer to the actual distance values in the application scene, rather than page display distances displayed on the display page 601, that is, the first distance threshold 603 and the second distance threshold 605 may be considered as distances between location information in the application scene.

In event that the associated virtual object is determined by using the attribute category of the main virtual object, attribute categories of at least two raw virtual objects in an application scene are obtained, a raw virtual object whose attribute category is a user character attribute is determined as a user virtual object, and a raw virtual object whose attribute category is a system character attribute is determined as a system virtual object. A group tag of the user virtual object is obtained and a user virtual object whose group tag is the same as a group tag of the main virtual object is determined as an associated user virtual object. The associated user virtual object and the system virtual object are determined as the associated virtual objects associated with the main virtual object. For example, in a game scene, a player (the main virtual object) may probably need to know location information of a virtual object pertaining to a same group as the player, or the like. Therefore, a group tag of the player may be obtained, user virtual objects whose attribute categories are user character attributes are obtained from raw virtual objects, an associated user virtual object whose group tag is the same as that of the main virtual object is obtained from the user virtual objects, and the user virtual object is a non-NPC object except the player in the game scene. In event that a plurality of user virtual objects team up for the game scene or team up after entering the game scene, a same group tag is added to the plurality of user virtual objects to indicate that the plurality of user virtual objects are in the same group. By determining the associated virtual object by using the attribute category of the main virtual object, virtual objects pertaining to a same group as the main virtual object may be displayed on a display page of a target client, so that the main virtual object can view, in real time, location information of the virtual objects in the same group as the main virtual object, that is, can obtain the situation of teammates of the main virtual object in real time, thereby improving the interactivity among the virtual objects in the same group.

The associated virtual object associated with the main virtual object can be determined in combination with a visual range and an attribute category of the main virtual object, a raw virtual object whose distance information is less than or equal to a first distance threshold, a virtual object to be selected whose line-of-sight angle information is less than a visual angle threshold, and an associated user virtual object are determined as the associated virtual objects associated with the main virtual object. The associated user virtual object is determined based on a group tag. Further, raw virtual objects whose attribute categories are user character attributes are obtained and determined as user virtual objects, and a user virtual object whose group tag is the same as a group tag of the main virtual object is determined as the associated user virtual object.

In event that the associated virtual object is determined by using the visual range of the main virtual object, the distance relationship list includes distance information between each system virtual object and each user virtual object. A distance range of the distance information between each raw virtual object and the main virtual object is obtained and an update buffering time of each raw virtual object is obtained. A list update time threshold corresponding to the distance range is obtained, and a raw virtual object of which a difference between the update buffering time and a third system network time is greater than or equal to the list update time threshold, among the at least two raw virtual objects, is determined as a target virtual object. The distance information between the target virtual object and the main virtual object in the distance relationship list is updated. A plurality of distance ranges are obtained by classifying the distance information between each raw virtual object and the main virtual object, and a list update time threshold is set for each distance range, to update the distance information corresponding to different distance ranges by using different list update time thresholds, so that the update frequency is relatively large in event that the distance information is relatively short and the update frequency is relatively small in event that the distance information is relatively long, so as to reduce the update frequency of the distance relationship list and reduce the update data amount of the distance relationship list without affecting displaying of a frame image of the main virtual object.

Step S502: Obtain a first-type variable among character variables of the associated virtual object.

Further, a variable pertaining to a first update frequency type among the character variables of the associated virtual object is obtained as the first-type variable. The variable of the first update frequency type may be considered as a variable that is changed every frame in an application scene. Further, a set of class objects corresponding to the main virtual object is obtained, the set of class objects including at least two subsets of object variables. A subset of object variables corresponding to the associated virtual object is obtained from the at least two subsets of object variables of the set of class objects, the subset of object variables including the variable pertaining to the first update frequency type among the character variables of the associated virtual object. The first-type variable of the associated virtual object is obtained from the subset of object variables. The first-type variable may include location information, visual field direction information, speed information, acceleration information, path information, Ragdoll information, or the like. The acceleration information and the visual field direction information or the like may be obtained through calculation by the client based on received change data, and therefore it may be considered that the computer device does not need to process the acceleration information and the visual field direction information or the like. The Ragdoll information is skeleton information of the associated virtual object and used for rendering a character form of the corresponding associated virtual object, that is, the Ragdoll information may be used for rendering the associated virtual object to be displayed on a display page. The process of obtaining the first-type variable may also be referred to in step S201 in FIG. 2, which is not described herein again.

In event that the first-type variable includes historical path information, a motion track of the associated virtual object within a target time range is obtained, motion location points of the associated virtual object are determined based on the motion track, the motion location points are determined as path information of the associated virtual object, and the historical path information in the first-type variable is updated to the path information, the target time range referring to an interval of time for updating the path information in the first-type variable. In other words, the motion track of the associated virtual object within the target time range may be predicted, the motion location points of the associated virtual object are determined based on the motion track, the historical path information is updated to path information determined based on the motion location points, a path update time of the path information is recorded, and the path information of the associated virtual object is predicted again in a target time range based on the path update time. For example, it is assumed that the target time range is 2 s and the recorded path update time is 6:35:05, based on which, a next time of updating the path information is 6:35:07. Further, the path update time can be accurate to milliseconds or the like, and the path update time is synchronously updated every time the path information is updated.

Figure 7:
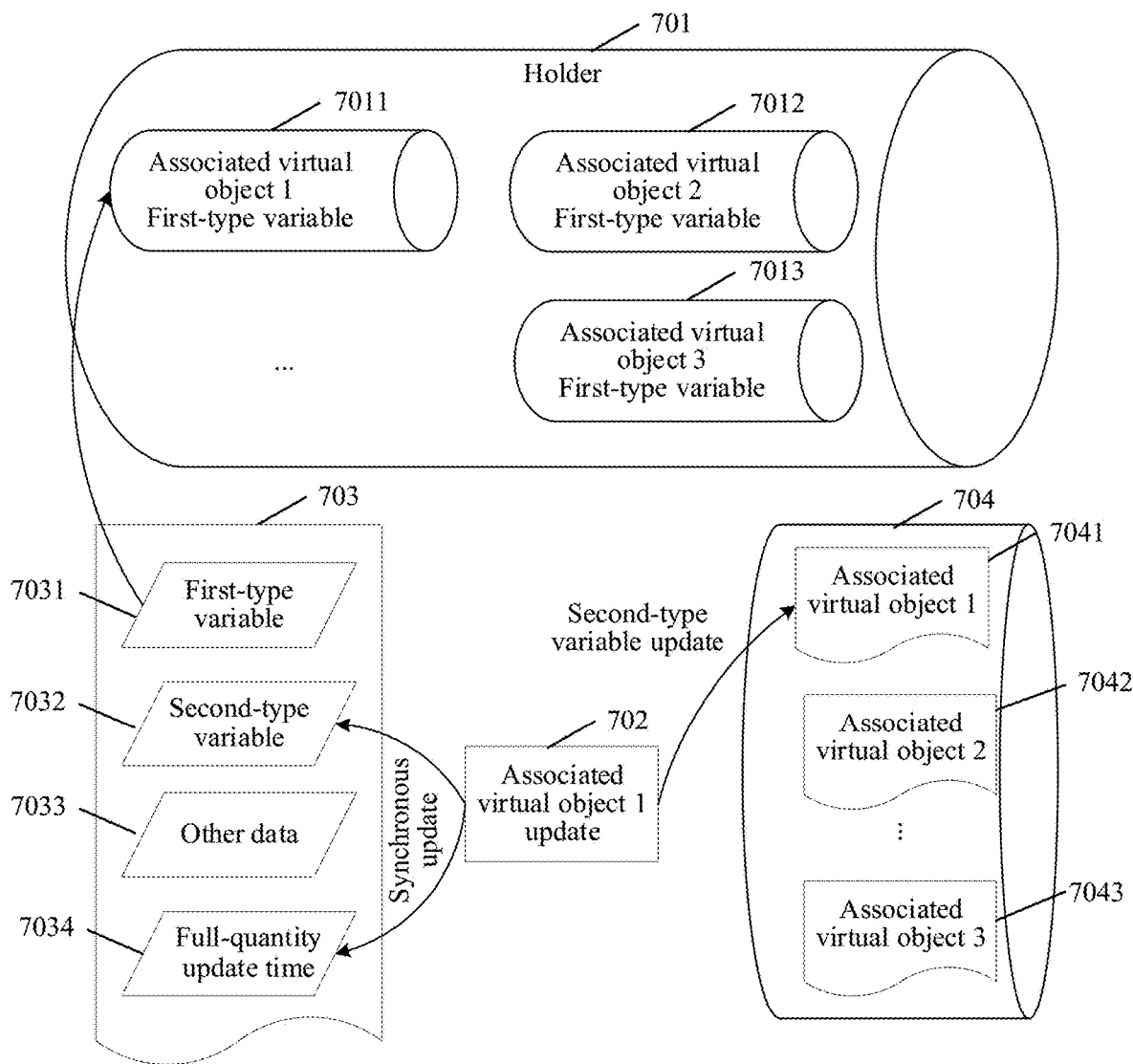
FIG. 7 is a schematic diagram of a scene of determining a first-type variable according to an embodiment of this application.

Further, referring to FIG. 7, FIG. 7 is a schematic diagram of a scene of determining a first-type variable according to an embodiment of this application. As shown in FIG. 7, a set of class objects 701 corresponding to the main virtual object is obtained. The set of class objects 701 includes at least two subsets of object variables, including a subset of object variables 7011, a subset of object variables 7012, a subset of object variables 7013, and the like. Each subset of object variables includes variables pertaining to the first update frequency type among the character variables corresponding to the associated virtual object, that is, the first-type variable corresponding to the associated virtual object. As shown in FIG. 7, the subset of object variables 7011 includes a first-type variable of an associated virtual object 1, the subset of object variables 7012 includes a first-type variable of an associated virtual object 2, and the subset of object variables 7013 includes a first-type variable of an associated virtual object 3, and so on. The first-type variable corresponding to the associated virtual object may be obtained from each subset of object variables. Associated virtual object 1 update 702 is used as an example. Character variables 703 of the associated virtual object 1 include a first-type variable 7031, a second-type variable 7032, other data 7033, and a full-quantity update time 7034. In response to determining that the associated virtual object 1 is a virtual object associated with the main virtual object, the first-type variable 7031 of the associated virtual object 1 is added to the set of class objects 701 as the subset of object variables 7011. The other virtual objects each also include a first-type variable, a second-type variable, other data, and a full-quantity update time, or the like. The update process can refer to the update process of the associated virtual object 1. Therefore, after determining the associated virtual object associated with the main virtual object, the character variables of the associated virtual object are obtained, and the first-type variable is obtained from the character variables. FIG. 7 is used as an example. After obtaining the associated virtual object 1 associated with the main virtual object, the character variables 703 of the associated virtual object 1 are obtained, and the first-type variable 7031 is obtained from the character variable 703. The set of class objects may be considered as a Holder set of class objects, and the Holder is a class that transfers variables through replication of raw values and provides a changeable wrapper for unchangeable object references.

It may be considered that a quantity of sets of class objects is equal to a quantity of main virtual objects included in the application scene, and each set of class objects corresponds to one main virtual object and is used for processing the first-type variable corresponding to the main virtual object. In other words, after obtaining the main virtual objects in the application scene, the computer device creates a set of class objects for each main virtual object, obtains an associated virtual object associated with each main virtual object, and adds the first-type variable of the associated virtual object to the set of class objects corresponding to the main virtual object.

Step S503: Compress the first-type variable to obtain compressed data and encapsulate the compressed data into first change data of the main virtual object.

Further, the first-type variable is compressed to obtain the compressed data, and the compressed data is encapsulated to obtain the first change data of the main virtual object.

Further, in a compression method, the first-type variable includes location information; and the location information and a location accuracy of the associated virtual object are obtained, the location information is converted into integer location data based on the location accuracy, and the integer location data is determined as the compressed data, the integer location data being lossy data. A variable that is in first-type variable and whose data type is floating-point data can also be compressed in the compression method for the location information. An internal memory occupied by floating-point data is greater than that occupied by integer data, and therefore the internal memory occupied by the first-type variable can be reduced in this manner. For example, the location information is data indicated by (X, Y, Z), the location accuracy is 0.2 cm, X and Y of the location information are stored using 22 bits, and Z of the location information is stored using 20 bits, or the like. An internal memory of X, Y, and Z of the location information can be determined according to specific implementation of the application scene, and the location accuracy may also use other values. For example, X in the location information of an associated virtual object is 1001.252, X is compressed based on the location accuracy, to obtain compressed X, namely, 1001.2, and 1001.2 is updated to X in the integer location data, namely, 5006.

In a compression method, the first-type variable is obtained from a frame to be updated, and a historically buffered variable corresponding to the first-type variable is obtained from a historical frame where the main virtual object is located, the historical frame being a previous frame of the frame to be updated; a first differential variable between the historically buffered variable and the first-type variable is obtained; and the first differential variable is encoded to obtain the compressed data. The encoding may be Huffman encoding or the like which can compress or simplify data. A variable that is in the first-type variable and of which data between adjacent frames is in a progressive relationship, such as a variable of which data in a second frame is changed based on data in a first frame and data in a third frame is changed based on the data in the second frame, or the like, can be compressed in this manner. For example, the location information of the main virtual object is changed successively between adjacent frames, a historically buffered variable of the location information may be obtained, a first differential variable between the historically buffered variable and the location information is obtained, the first differential variable is encoded to obtain compressed data. If it is assumed that the historically buffered variable of the location information is (100, 201, 5) and the location information is (101, 201.2, 5), the first differential variable between the historically buffered variable and the location information is obtained, namely, (1, 0.2, 0), and then the first differential variable (1, 0.2, 0) is further encoded to obtain compressed data.

Figure 8:
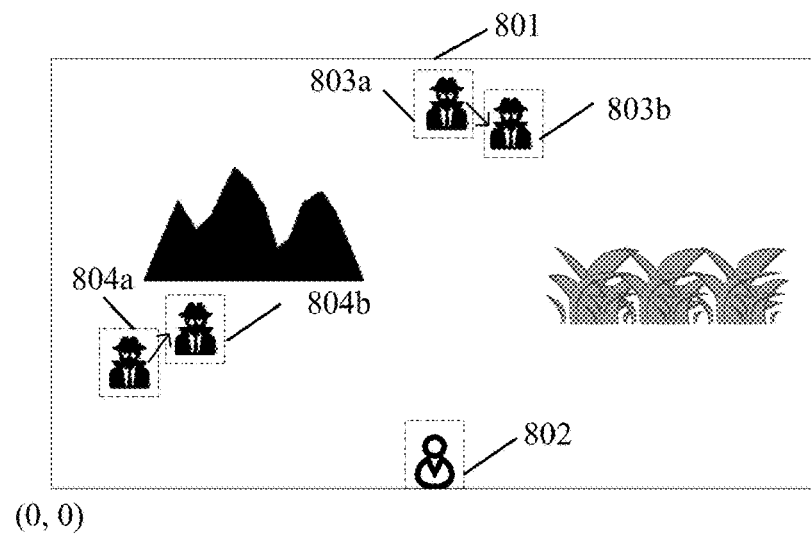
FIG. 8 is a schematic diagram of data processing of updating based on a historical frame according to an embodiment of this application.

Further, referring to FIG. 8, FIG. 8 is a schematic diagram of data processing of updating based on a historical frame according to an embodiment of this application. As shown in FIG. 8, a display page 801 of a target client where a main virtual object 802 is located displays an associated virtual object 803a and an associated virtual object 804a. It may be considered that what is displayed on the display page 801 is a historical frame, location information (that is, a historically buffered variable) of the associated virtual object 803a is obtained as (201, 100, 5) and location information (that is, a historically buffered variable) of the associated virtual object 804a is obtained as (10, 21, 5). In a frame to be updated, location information (204, 97, 5) of an associated virtual object 803b and location information (12, 25, 5) of an associated virtual object 804b are obtained. The historical frame may be considered as a previous frame of the frame to be updated. The location information of the associated virtual object 803a is the historically buffered variable of the location information of the associated virtual object 803b, and a first differential variable of the associated virtual object 803b is obtained as (3, −3, 0). The location information of the associated virtual object 804a is the historically buffered variable of the location information of the associated virtual object 804b, and a first differential variable of the associated virtual object 804b is obtained as (2, 4, 0). The first differential variable (3, −3, 0) and the first differential variable (2, 4, 0) are encoded, and an encoded result is transmitted to the target client. After receiving the encoded result, the target client restores the first differential variable (3, −3, 0) and the first differential variable (2, 4, 0), displays the associated virtual object 803b on the display page 801 based on the first differential variable (3, −3, 0), and displays the associated virtual object 804b on the display page 801 based on the first differential variable (2, 4, 0). In other words, at the time that the target client updates the associated virtual object 803a and the associated virtual object 804a on the display page 801 to obtain the associated virtual object 803b and the associated virtual object 804b, the associated virtual object 803a and the associated virtual object 804a no longer exist on the display page 801, and the historical frame displayed on the display page 801 is changed to the frame to be updated.

In a compression method, the first-type variable includes an object identifier of the associated virtual object; an object identifier of a preceding associated virtual object of the associated virtual object is obtained, and a second differential variable between the object identifier of the associated virtual object and the object identifier of the preceding associated virtual object is obtained, the associated virtual object being in a successively processing relationship with the preceding associated virtual object; and the second differential variable is encoded to obtain the compressed data. For example, for object identifiers of associated virtual objects, a difference between different object identifiers is relatively small, and compression may be performed in this manner. For example, in event that there are three associated virtual objects associated with the main virtual object, the object identifier of the first associated virtual object is 101, the object identifier of the second associated virtual object is 103, and the object identifier of the third associated virtual object is 107, it may be considered that the first associated virtual object is the preceding associated virtual object of the second associated virtual object and that the second associated virtual object is the preceding associated virtual object of the third associated virtual object. By using the compression method, it can be obtained that a second differential variable of the second associated virtual object is (103−101−1=1) and that a second differential variable of the third associated virtual object is (107−103−1=3). "−1" is performed because of the fact that the object identifiers of the two associated virtual objects cannot be the same, and "−1" may alternatively not be performed during obtaining of the second differential variable.

The foregoing compression methods may be performed in combination. For example, for location information, a second differential variable of the location information may be converted into integer location data and the integer location data is encoded to obtain compressed data, or the location information may be converted into integer location data, a second differential variable of the location information is obtained according to the integer location data, and the second differential variable is encoded to obtain compressed data.

In event that the first-type variable includes Ragdoll information, the Ragdoll information may be directly used as compressed data. The Ragdoll information is correlated with the location information, and therefore the Ragdoll information may be regarded as a variable pertaining to the first update frequency type. In event that the associated virtual object includes a plurality of first-type variables, after obtaining compressed data of each first-type variable, all compressed data is encapsulated to obtain the first change data.

Step S504: Transmit the first change data of the main virtual object to a target client where the main virtual object is located.

Further, the first change data of the main virtual object is transmitted to the target client where the main virtual object is located, so that the target client performs frame image update and display based on the first change data. After receiving the first change data, the target client restores the first change data to obtain the first-type variable and performs frame image update and display on the display page according to the first-type variable.

Step S505: Determine that a second-type variable is changed.

Further, in event that trigger information for the second-type variable of the associated virtual object is received, it is determined that the second-type variable is changed, and step S506 is performed. Alternatively, a historical update time of the second-type variable of the associated virtual object and a first system network time are obtained, the second-type variable being a variable pertaining to a second update frequency type among the character variables. In event that a difference between the first system network time and the historical update time is greater than or equal to an update time threshold of the second-type variable, it is determined that the second-type variable is changed, and step S506 is performed. The trigger information may be considered as operation information that may cause data update of the corresponding second-type variable. For example, in event that an associated virtual object is shot, blood volume information and a displacement animation parameter or the like of the associated virtual object may be changed, and the "shot" may be considered as the trigger information for the blood volume information and the displacement animation parameter or the like of the associated virtual object. In event that trigger information for the second-type variable of the associated virtual object is not received, but a difference between the first system network time and the historical update time is greater than or equal to the update time threshold of the second-type variable, it is determined that the second-type variable needs to be processed, and step S506 is performed. Or, in event that trigger information for the second-type variable of the associated virtual object is received, but a difference between the first system network time and the historical update time is less than the update time threshold of the second-type variable, it is determined that the second-type variable needs to be processed, and step S506 is performed. Or, in event that trigger information for the second-type variable of the associated virtual object is received, and a difference between the first system network time and the historical update time is greater than or equal to the update time threshold of the second-type variable, it is determined that the second-type variable needs to be processed, and step S506 is performed.

In response to any one of the following two conditions, namely, trigger information for the second-type variable of the associated virtual object is received, or a difference between the first system network time and the historical update time is greater than or equal to the update time threshold of the second-type variable, is satisfied, it may be directly determined, without determining whether the other condition is satisfied, that the second-type variable needs to be processed, and step S506 is performed. In event that the condition determined first is not satisfied, whether the other condition is satisfied is further determined. The execution sequence of determining processes of the two conditions is not limited.

Step S506: Obtain the second-type variable from the character variables of the associated virtual object and encapsulate the second-type variable into second change data.

Further, the second-type variable is obtained, the second-type variable being a variable pertaining to the second update frequency type among the character variables, and the second-type variable is encapsulated into the second change data of the main virtual object. In event that the difference between the first system network time and the historical update time is greater than or equal to the update time threshold of the second-type variable, the second-type variable may be encapsulated into third change data of the main virtual object. In other words, the second-type variable may be some trigger type variables, for example, shot information change, an attack behavior, and a displacement animation parameter or the like of a virtual object. In event that the second-type variable is changed, an actor replication method may be performed on the associated virtual object corresponding to the second-type variable, so as to perform full-quantity replication on the second-type variable.

Step S507: Transmit the second change data of the main virtual object to the target client where the main virtual object is located.

Further, the second change data is transmitted to the target client where the main virtual object is located, so that the target client performs frame image update and display based on the second change data. In event that the third change data is obtained, the third change data is transmitted to the target client where the main virtual object is located, so that the target client performs frame image update and display based on the third change data.

Further, referring to FIG. 7, in event that a second-type variable 7041 of the associated virtual object 1 is updated, the second-type variable 7041 is added to a full-quantity update list 704, and the full-quantity update list 704 including second-type variables of associated virtual objects that need to be updated in the current data processing process. For example, in this data processing process, in event that the second-type variable 7041 of the associated virtual object 1, a second-type variable 7042 of the associated virtual object 2, and a second-type variable 7043 of the associated virtual object 3 are updated, the second-type variable 7041 of the associated virtual object 1, the second-type variable 7042 of the associated virtual object 2, and the second-type variable 7043 of the associated virtual object 3 are added to the full-quantity update list 704.

Figure 9:
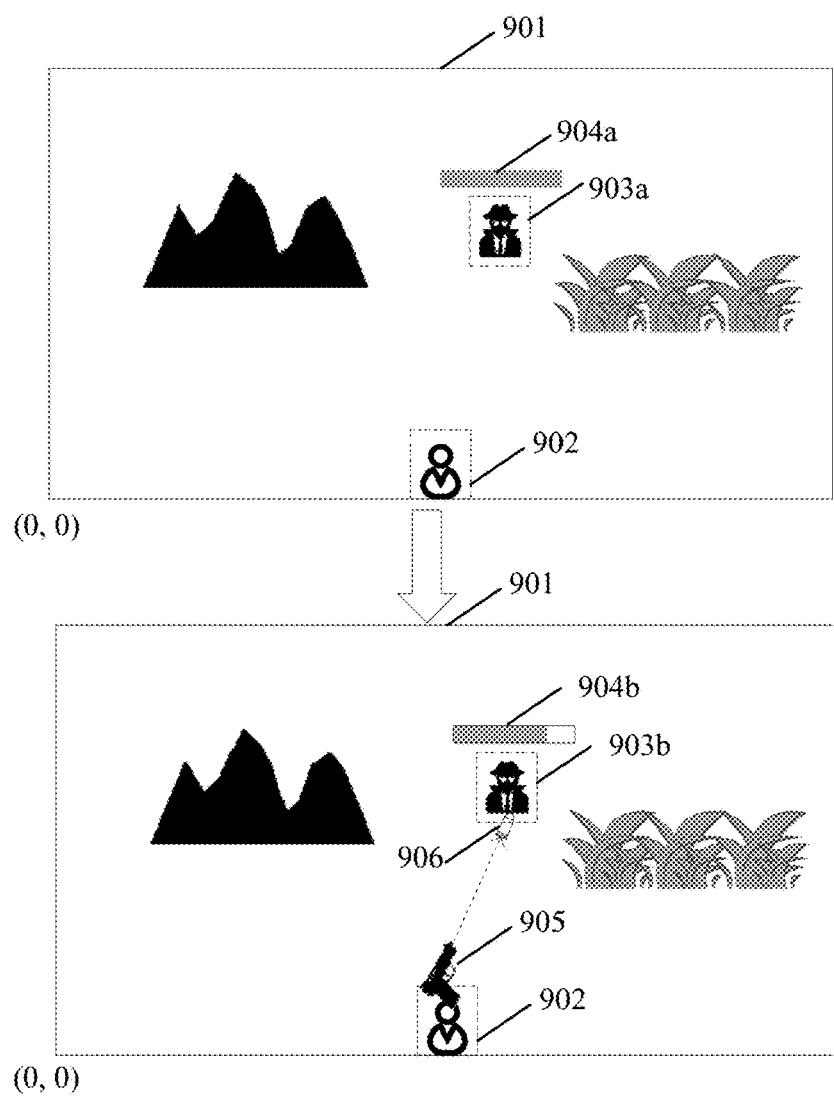
FIG. 9 is a schematic diagram of a trigger scene for a second-type variable according to an embodiment of this application.

For the foregoing step S505 to step S507, for example, referring to FIG. 9, FIG. 9 is a schematic diagram of a triggering scene for a second-type variable according to an embodiment of this application. As shown in FIG. 9, it is assumed that a second-type variable of an associated virtual object 903a of a main virtual object 902 includes blood volume information 904a, shot information, and the like. The blood volume information 904a is used as an example. In event that a display page 901 of a target client where the main virtual object 902 is located displays an associated virtual object 903a and blood volume information 904a of the associated virtual object 903a, the main virtual object 902 shoots the associated virtual object 903a using a far-range shooting tool 905. The blood volume information 904a is 100%, and the far-range shooting tool 905 may be a crossbow, a firearm, a blasting tool, or the like. If it is assumed that the far-range shooting tool 905 is a firearm, in event that a bullet 906 fired from the firearm hits the associated virtual object 903a, a computer device receives that the associated virtual object 903a is shot, that is, trigger information for the second-type variable of the associated virtual object 903a is received, and a second-type variable of the associated virtual object 903b is obtained. The associated virtual object 903a and the associated virtual object 903b may be considered as the same virtual object displayed in adjacent frames, and different reference signs are used herein to indicate that the character variables of the virtual object have changed. After obtaining that the blood volume information 904b of the associated virtual object 903b is 80%, the computer device encapsulates the blood volume information 904b to obtain second change data and transmits the second change data to the target client. The target client restores the blood volume information 904b based on the received second change data and displays the associated virtual object 903b and the blood volume information 904b of the associated virtual object 903b on the display page 901. In event that the associated virtual object 903a is hit by the bullet 906, the displacement animation parameter of the associated virtual object 903a may also change due to a force between the associated virtual object 903a and the bullet 906. In this case, the trigger information also aims at the displacement animation parameter of the associated virtual object 903a. For the associated virtual object, the same trigger information may aim at least one second-type variable, which is not limited herein.

After receiving that the associated virtual object 903a is shot, the computer device may obtain the blood volume information 904b of the associated virtual object 903b based on a damage value of the bullet 906 that hits the associated virtual object 903a, a portion where the associated virtual object 903a is shot, and the blood volume information 904a of the associated virtual object 903a. Alternatively, the computer device obtains a damage value of the bullet 906 and a portion where the associated virtual object 903a is shot, then determines a blood reduced value of the associated virtual object 903a, and encapsulates the blood reduced value into the second change data, to be restored by the target client to obtain the blood reduced value, and the target client then obtains the blood information 904b based on the blood information 904a of the previous frame and the blood reduced value and displays the blood information 904b on the display page 901.

The processing process of the first-type variable (step S502 to step S504) and the processing process of the second-type variable (step S505 to step S507) may be performed synchronously or asynchronously, and the execution sequence of the two is not limited. The compressed data is obtained after step S502 to step S503 are performed and the second-type variable is obtained after step S505 to step S506 are performed. The compressed data and the second-type variable are encapsulated to obtain target change data and the target change data is transmitted to the target client where the main virtual object is located, so that the target client can perform frame image update and display based on the target change data. Referring to FIG. 7, after obtaining the first-type variable of each associated virtual object associated with the main virtual object, the first-type variable of each associated virtual object is added to the set of class objects 701 as a subset of object variables; and a second-type variable whose data has been updated in the current data processing process is obtained and the second-type variable whose data has been updated is added to the full-quantity update list 704. The data of each subset of object variables included in the set of class objects 701 is compressed to obtain compressed data corresponding to each subset of object variables. The computer device encapsulates the compressed data obtained after processing in the set of class objects 701 and each second-type data included in the full-quantity update list 704 to obtain target change data and transmits the target change data the target client where the main virtual object is located, so that the target client performs frame image update and display based on the target change data.

After step S502 is performed, a historical full-quantity update time of the first-type variable of the associated virtual object and a second system network time are obtained; in event that a difference between the historical full-quantity update time and the second system network time is greater than or equal to a full-quantity update time threshold, the first-type variable is encapsulated into full-quantity change data, and the full-quantity change data is transmitted to the target client, so that the target client performs frame image update and display based on the full-quantity change data and updates the historical full-quantity update time based on the second system network time; or in event that a difference between the historical full-quantity update time and the second system network time is less than a full-quantity update time threshold, step S503 is performed, and the first-type variable is compressed to obtain the compressed data. The historical full-quantity update time may be included in the character variables corresponding to the associated virtual object, as shown in FIG. 7, and the historical full-quantity update time is the full-quantity update time 7034 in the character variables 703 of the associated virtual object 1. The historical full-quantity update time may also be stored in other ways, which is not limited herein. During processing, character variables may be associated with a corresponding associated virtual object by using an object identifier, to indicate the associated virtual object to which the character variables pertain.

Figure 10:
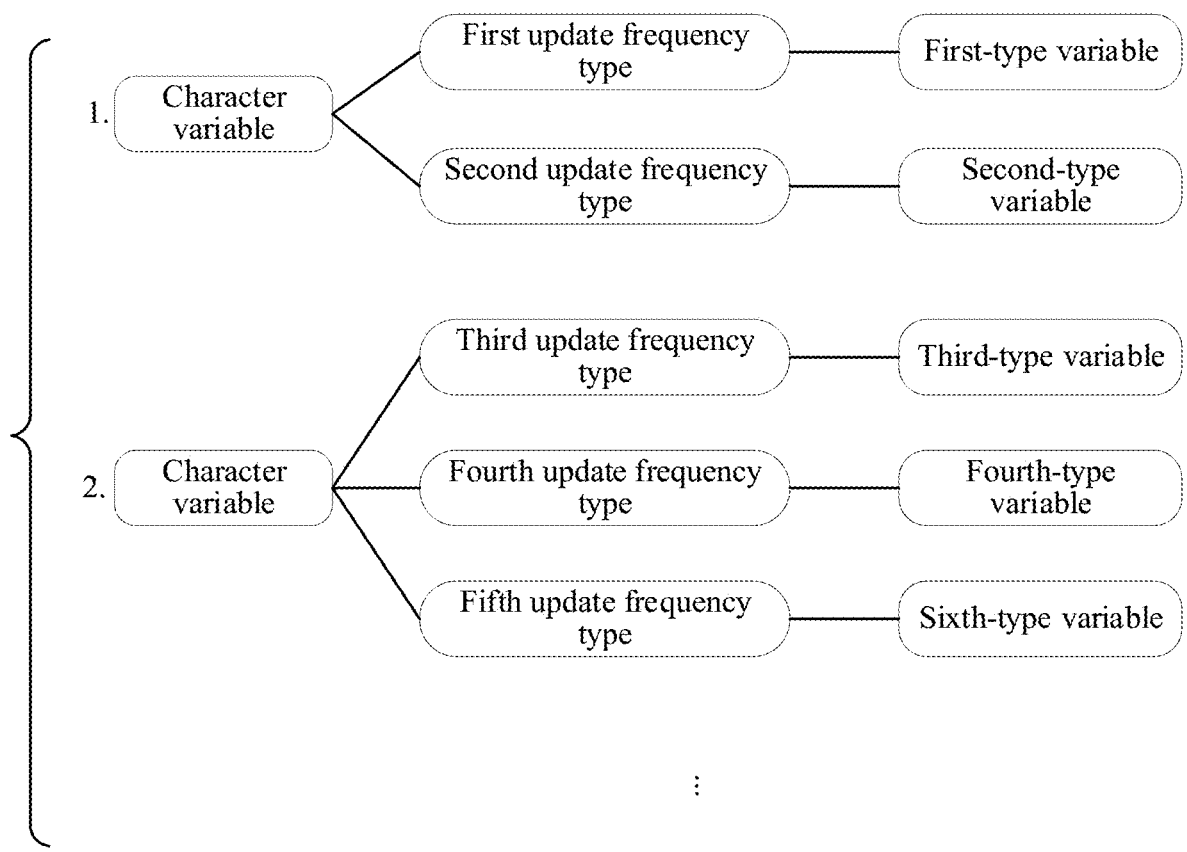
FIG. 10 is a schematic diagram of a scene of classifying variables according to an embodiment of this application.

Further, the character variables of a virtual object may alternatively be classified into at least two categories, such as the first-type variable pertaining to the first update frequency type and the second-type variable pertaining to the second update frequency type. In addition to this classification manner, the character variables may also be classified into more categories of variables based on different update frequency types, for example, classified into three types of variables, four types of variables, five types of variables, or the like. In different classification manners, the update frequency type of each type of variables differs one another. In the same classification manner, different update frequency types may be managed by using a tree structure, and data processing methods for variables corresponding to different update frequency types are different. For example, FIG. 10 is a schematic diagram of a scene of classifying variables according to an embodiment of this application. As shown in FIG. 10, in a first classification manner, character variables are classified based on a first update frequency type and a second update frequency type, a variable pertaining to the first update frequency type among the character variables is used as a first-type variable, and a variable pertaining to the second update frequency type among the character variables is used as a second-type variable. Data processing methods of the first-type variable and the second-type variable are different. A complete associated virtual object can be rendered by using the first-type variable and the second-type variable. In a second classification manner, character variables are classified based on a third update frequency type, a fourth update frequency type, and a fifth update frequency type, a variable pertaining to the third update frequency type among the character variables is used as a third-type variable, a variable pertaining to the fourth update frequency type among the character variables is used as a fourth-type variable, and a variable pertaining to the fifth update frequency type among the character variable is used as a fifth-type variable. Data processing methods of the third-type variable, the fourth-type variable, and the fifth-type variable are different. A complete associated virtual object can be rendered by using the third-type variable, the fourth-type variable, and the fifth-type variable. Similarly, character variables may alternatively be classified in other classification manners.

In the embodiments of this application, an associated virtual object associated with a main virtual object is obtained, a variable pertaining to a first update frequency type among character variables of the associated virtual object is obtained and used as a first-type variable, the first-type variable is compressed to obtain compressed data, the compressed data is encapsulated to obtain first change data of the main virtual object, and the first change data is transmitted to a target client where the main virtual object is located, so that the target client performs frame image update and display based on the first change data. In addition, in event that a second-type variable is changed, the second-type variable is updated, or a second-type variable is periodically updated, and the first-type variable is continuously periodically updated in full quantity, thereby resolving the packet loss problem that may occur before full-quantity update. Through the foregoing process, the character variables of the associated virtual objects are classified and the first-type variable pertaining to the first update frequency type is compressed, greatly reducing the amount of data to be processed and the amount of data to be transmitted, thereby improving the data processing efficiency.

Figure 11:
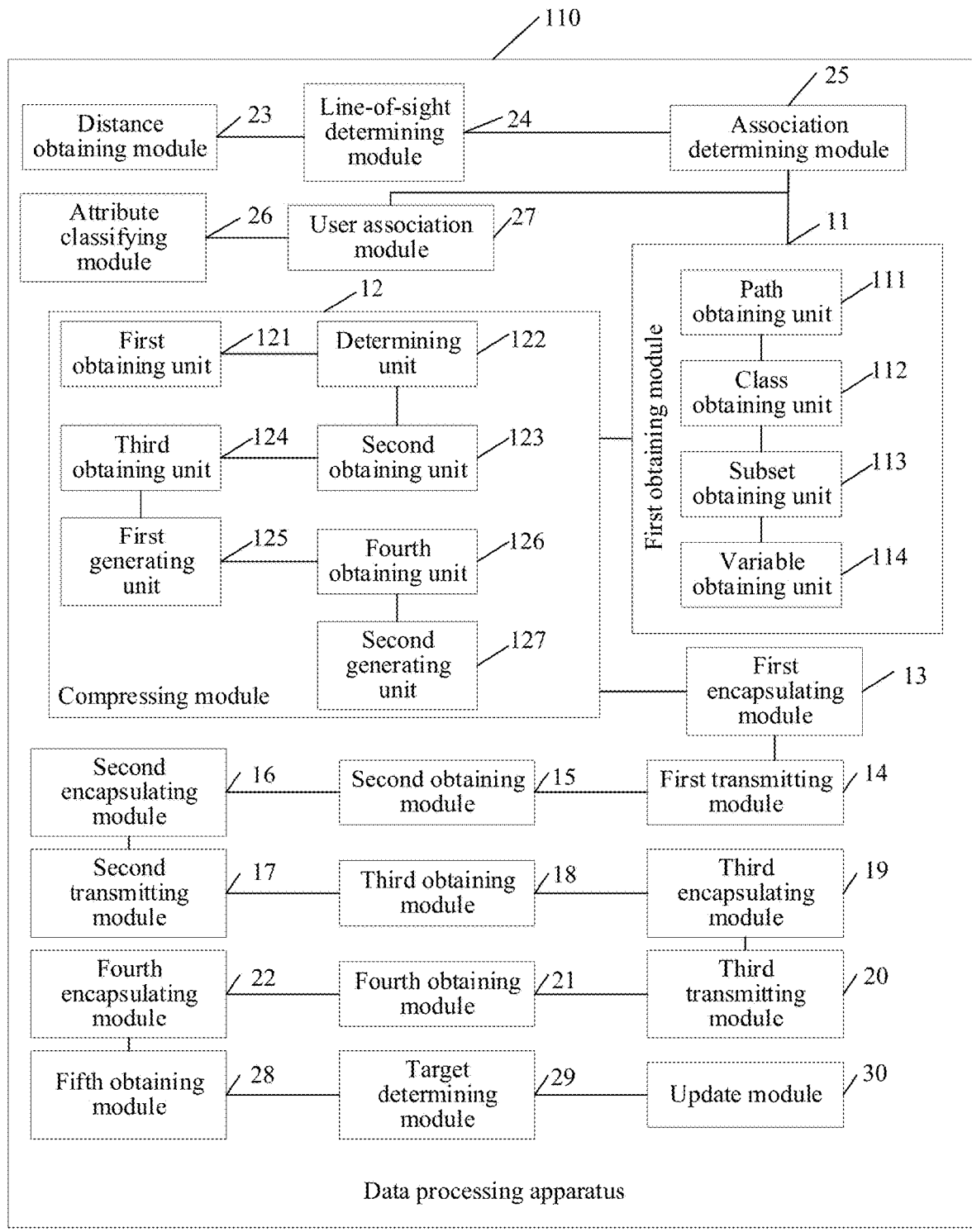
FIG. 11 is a schematic diagram of a data processing apparatus according to an embodiment of this application.

Referring to FIG. 11, FIG. 11 is a schematic diagram of a data processing apparatus according to an embodiment of this application. The data processing apparatus may be a computer program (including program code) run on a computer device. For example, the data processing apparatus is application software. The apparatus may be used to perform the corresponding steps in the method provided in the embodiments of this application. As shown in FIG. 11, the data processing apparatus 110 may be used in the computer device of the embodiment corresponding to FIG. 2. Further, the data processing apparatus 110 may include a first obtaining module 11, a compressing module 12, a first encapsulating module 13, and a first transmitting module 14.

The first obtaining module 11 is configured to obtain an associated virtual object associated with a main virtual object and obtain a variable pertaining to a first update frequency type among character variables of the associated virtual object as a first-type variable.

The compressing module 12 is configured to compress the first-type variable to obtain compressed data.

The first encapsulating module 13 is configured to encapsulate the compressed data to obtain first change data of the main virtual object.

The first transmitting module 14 is configured to transmit the first change data of the main virtual object to a target client where the main virtual object is located, so that the target client performs frame image update and display based on the first change data.

The apparatus 110 further includes:

a second obtaining module 15, configured to obtain a second-type variable in response to trigger information for the second-type variable of the associated virtual object being received, the second-type variable being a variable pertaining to a second update frequency type among the character variables;

a second encapsulating module 16, configured to encapsulate the second-type variable into second change data of the main virtual object; and a second transmitting module 17, configured to transmit the second change data to the target client where the main virtual object is located, so that the target client performs frame image update and display based on the second change data.

The apparatus 110 further includes:

a third obtaining module 18, configured to obtain a historical update time of a second-type variable of the associated virtual object and a first system network time, the second-type variable being a variable pertaining to a second update frequency type among the character variables;

a third encapsulating module 19, configured to encapsulate the second-type variable into third change data of the main virtual object in response to a difference between the first system network time and the historical update time being greater than or equal to an update time threshold of the second-type variable; and a third transmitting module 20, configured to transmit the third change data to the target client where the main virtual object is located, so that the target client performs frame image update and display based on the third change data.

The first-type variable includes location information.

The compressing module 12 includes:

a first obtaining unit 121, configured to obtain the location information and a location accuracy of the associated virtual object; and a determining unit 122, configured to convert the location information into integer location data based on the location accuracy and determine the integer location data as the compressed data.

The compressing module 12 includes:

a second obtaining unit 123, configured to obtain the first-type variable from a frame to be updated, and obtain a historically buffered variable corresponding to the first-type variable from a historical frame where the main virtual object is located, the historical frame being a previous frame of the frame to be updated;

a third obtaining unit 124, configured to obtain a first differential variable between the historically buffered variable and the first-type variable; and a first generating unit 125, configured to encode the first differential variable to obtain the compressed data.

The first-type variable includes an object identifier of the associated virtual object.

The compressing module 12 includes:

a fourth obtaining unit 126, configured to obtain an object identifier of a preceding associated virtual object of the associated virtual object and obtain a second differential variable between the object identifier of the associated virtual object and the object identifier of the preceding associated virtual object, the associated virtual object being in a successively processing relationship with the preceding associated virtual object; and a second generating unit 127, configured to encode the second differential variable to obtain the compressed data.

The first-type variable includes historical path information.

The first obtaining module 11 includes:

a path obtaining unit 111, configured to obtain a motion track of the associated virtual object within a target time range, determine motion location points of the associated virtual object based on the motion track, determine the motion location points as path information of the associated virtual object, and update the historical path information in the first-type variable to the path information, the target time range referring to an interval of time for updating the path information in the first-type variable.

The apparatus 110 further includes:

a fourth obtaining module 21, configured to obtain a historical full-quantity update time of the first-type variable of the associated virtual object and a second system network time; and a fourth encapsulating module 22, configured to encapsulate the first-type variable into full-quantity change data in response to a difference between the historical full-quantity update time and the second system network time being greater than or equal to a full-quantity update time threshold, and transmit the full-quantity change data to the target client, so that the target client performs frame image update and display based on the full-quantity change data; or the fourth encapsulating module 22 being further configured to perform an operation of compressing the first-type variable to obtain the compressed data by using the compressing module 12 in response to the difference between the historical full-quantity update time and the second system network time being less than the full-quantity update time threshold.

The apparatus 110 further includes:

a distance obtaining module 23, configured to obtain distance information between the main virtual object and at least two raw virtual objects from a distance relationship list;

a line-of-sight determining module 24, configured to obtain a virtual object to be selected whose distance information is greater than a first distance threshold and less than or equal to a second distance threshold from the at least two raw virtual objects and determine line-of-sight angle information between the virtual object to be selected and visual field direction information of the main virtual object; and an association determining module 25, configured to determine a raw virtual object whose distance information is less than or equal to the first distance threshold or a virtual object to be selected whose line-of-sight angle information is less than a visual angle threshold as the associated virtual object associated with the main virtual object.

The apparatus 110 further includes:

an attribute classifying module 26, configured to obtain attribute categories of at least two raw virtual objects in an application scene, determine a raw virtual object whose attribute category is a user character attribute as a user virtual object, and determine a raw virtual object whose attribute category is a system character attribute as a system virtual object;

a user association module 27, configured to obtain a group tag of the user virtual object and determine a user virtual object whose group tag is the same as a group tag of the main virtual object as an associated user virtual object; and the association determining module 25 being further configured to determine the associated user virtual object and the system virtual object as the associated virtual objects associated with the main virtual object.

The apparatus 110 further includes:

a fifth obtaining module 28, configured to obtain a distance range of the distance information between each raw virtual object and the main virtual object and obtain an update buffering time of each raw virtual object;

a target determining module 29, configured to obtain a list update time threshold corresponding to the distance range and determine a raw virtual object of which a difference between the update buffering time and a third system network time is greater than or equal to the list update time threshold, among the at least two raw virtual objects, as a target virtual object; and an update module 30, configured to update the distance information between the target virtual object and the main virtual object in the distance relationship list.

The first obtaining module 11 includes:

a class obtaining unit 112, configured to obtain a set of class objects corresponding to the main virtual object, the set of class objects including at least two subsets of object variables;

a subset obtaining unit 113, configured to obtain a subset of object variables corresponding to the associated virtual object from the at least two subsets of object variables of the set of class objects, the subset of object variables including a variable pertaining to the first update frequency type among the character variables of the associated virtual object; and a variable obtaining unit 114, configured to obtain the first-type variable of the associated virtual object from the subset of object variables.

The embodiments of this application describe a data processing apparatus. By using the apparatus, an associated virtual object associated with a main virtual object is obtained, a variable pertaining to a first update frequency type among character variables of the associated virtual object is obtained and used as a first-type variable, the first-type variable is compressed to obtain compressed data, the compressed data is encapsulated to obtain first change data of the main virtual object, and the first change data is transmitted to a target client where the main virtual object is located, so that the target client performs frame image update and display based on the first change data. Through the foregoing process, the character variables of the associated virtual objects are classified and the first-type variable pertaining to the first update frequency type is compressed, greatly reducing the amount of data to be processed and the amount of data to be transmitted, thereby improving the data processing efficiency.

Figure 12:
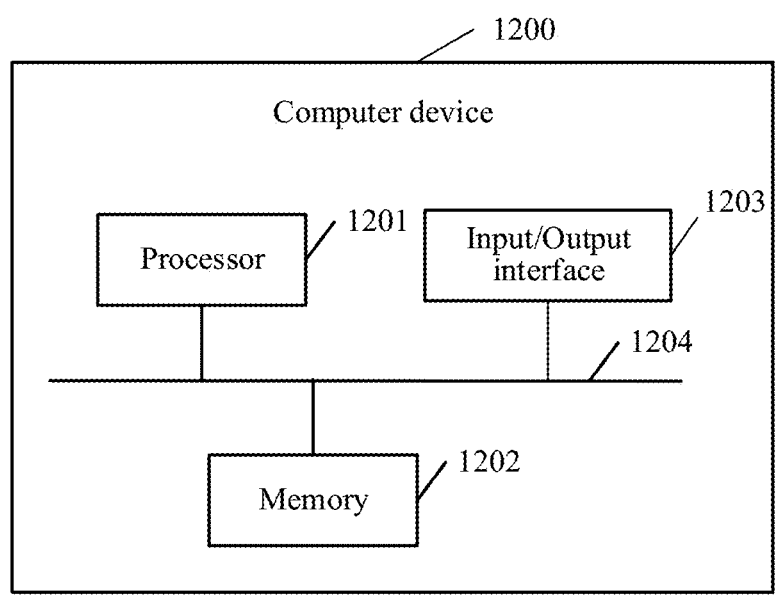
FIG. 12 is a schematic structural diagram of a computer device according to an embodiment of this application.

Referring to FIG. 12, FIG. 12 is a schematic structural diagram of a computer device according to an embodiment of this application. As shown in FIG. 12, a computer device 1200 in this embodiment of this application includes: one or more processors 1201, a memory 1202, and an input/output interface 1203. The processor 1201, the memory 1202, and the input/output interface 1203 are connected via a bus 1204. The memory 1202 is configured to store a computer program. The computer program includes program instructions. The input/output interface 1203 is configured to input and output data, including data exchange between communications clients and an event server and data exchange between a user and the communications clients. The processor 1201 is configured to execute the program instructions stored in the memory 1202, to perform the following operations:

obtaining an associated virtual object associated with a main virtual object and obtaining a variable pertaining to a first update frequency type among character variables of the associated virtual object as a first-type variable;

compressing the first-type variable to obtain compressed data and encapsulating the compressed data to obtain first change data of the main virtual object; and transmitting the first change data of the main virtual object to a target client where the main virtual object is located, so that the target client performs frame image update and display based on the first change data.

In some implementations, the processor 1201 may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor and the like.

The memory 1202 may include a ROM and a RAM, and provides an instruction and data to the processor 1201 and an input/output interface 1202. A part of the storage 1240 may further include a non-volatile random access memory. For example, the memory may further store information about a device type.

In the specific implementation, the computer may perform the implementation provided by the steps in FIG. 2 or FIG. 5 by using the built-in functional modules, and the implementations provided by the steps in FIG. 2 or FIG. 5 may be referred to for details, which are not repeated herein.

An embodiment of this application provides a computer, including: a processor, an input/output interface, and a memory. The processor obtains computer instructions from the memory, performs the steps of the method shown in FIG. 2 or FIG. 5, and performs data processing operations. By using the computer instructions in the memory, the processor performs the following operations: obtaining an associated virtual object associated with a main virtual object, obtaining a variable pertaining to a first update frequency type among character variables of the associated virtual object as a first-type variable, compressing the first-type variable to obtain compressed data, encapsulating the compressed data to obtain first change data of the main virtual object, and transmitting the first change data to a target client where the main virtual object is located, so that the target client performs frame image update and display based on the first change data. In addition, in event that a second-type variable is changed, the second-type variable is updated, or a second-type variable is periodically updated, and the first-type variable is continuously periodically updated in full quantity, thereby resolving the packet loss problem that may occur before full-quantity update. Through the foregoing process, the character variables of the associated virtual objects are classified and the first-type variable pertaining to the first update frequency type is compressed, greatly reducing the amount of data to be processed and the amount of data to be transmitted, thereby improving the data processing efficiency.

The embodiments of this application further provide a computer program product or a computer program. The computer program product or the computer program includes computer instructions, the computer instructions being stored in a computer-readable storage medium. A processor of a computer device reads the computer instructions from the computer-readable storage medium, and executes the computer instructions, so that the computer device performs the data processing method shown in FIG. 2 or FIG. 5.

An embodiment of this application further provides a computer-readable storage medium. The computer-readable storage medium stores a computer program. The computer program includes program instructions, and the program instructions, when run by a processor, implement the data processing method provided in the operations of FIG. 2 or FIG. 5, and the implementations provided by the operations in FIG. 2 or FIG. 5 may be referred to for details, which are not repeated herein.

The computer-readable storage medium may be the data processing apparatus provided in any of the foregoing embodiments or an internal storage unit of the computer, for example, a hard disk or an internal memory of the computer. The computer-readable storage medium may also be an external storage device of the computer, such as a plug-in hard disk, a smart media card (SMC), a secure digital (SD) card, or a flash card that is equipped on the computer. Further, the computer-readable storage medium may also include an internal storage unit of the computer and an external storage device. The computer-readable storage medium is used for storing the computer program and another program and data required by the computer. The computer-readable storage medium may be further used for temporarily storing data that has been output or will be output.

In the specification, claims, and accompanying drawings of the embodiments of this application, the terms "first", "second", and the like are intended to distinguish between different objects but do not indicate a particular order. In addition, the terms "include" and any variant thereof are intended to cover a non-exclusive inclusion. For example, a process, method, apparatus, product, or device that includes a series of steps or units is not limited to the listed steps or modules, but further includes a step or a module that is not listed, or further optionally includes another step unit that is intrinsic to the process, method, apparatus, product, or device.

A person skilled in the art may realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

The method and related apparatus provided in the embodiments of this application are described with reference to the method flowcharts and/or schematic structural diagrams provided in the embodiments of this application, and further each flow and/or block of the method flowcharts and/or schematic structural diagrams and combinations of the flows and/or blocks of the method flowcharts and/or block diagrams may be implemented by computer program instructions. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A data processing method, performed by a computer device, the method comprising:
    obtaining an associated virtual object associated with a main virtual object and obtaining a first-type variable belonging to a set of first-type variables among character variables of the associated virtual object, the set of first-type variables pertaining to a first update frequency for informing the first-type variable to a target client associated with the main virtual object;
    compressing the first-type variable to obtain compressed data and encapsulating the compressed data to obtain first change data of the associated virtual object;
    transmitting the first change data of the associated virtual object to the target client at a first timing indicated by the first update frequency, so that the target client performs frame image update and display based on the first change data; and
    transmitting at least a second-type variable among the character variables of the associated virtual object other than the set of first-type variables at a second timing different from the first timing.

2. The method according to claim 1, wherein transmitting at least the second-type variable comprises:
    obtaining the second-type variable in response to receipt of trigger information for the second-type variable of the associated virtual object, the second-type variable being a variable among the character variables pertaining to the second timing for updating the target client; and
    encapsulating the second-type variable into second change data of the associated virtual object and transmitting the second change data to the target client, so that the target client performs frame image update and display based on the second change data.

3. The method according to claim 1, wherein transmitting at least the second-type variable comprises:
    obtaining a historical update time of the second-type variable of the associated virtual object and a first system network time, the second-type variable being a variable among the character variables pertaining to the second timing for updating the target client; and
    encapsulating the second-type variable into third change data of the associated virtual object in response to a difference between the first system network time and the historical update time being greater than or equal to an update time threshold of the second-type variable, and transmitting the third change data to the target client, so that the target client performs the frame image update and display based on the third change data.

4. The method according to claim 1, wherein the first-type variable comprises location information; and
compressing the first-type variable to obtain compressed data comprises:
obtaining the location information and a location accuracy of the associated virtual object, converting the location information into integer location data based on the location accuracy, and determining the integer location data as the compressed data.

5. The method according to claim 1, wherein compressing the first-type variable to obtain compressed data comprises:
obtaining the first-type variable from a frame to be updated, and obtaining a historically buffered variable corresponding to the first-type variable from a historical frame where the main virtual object is located, the historical frame being a previous frame of the frame to be updated;
obtaining a first differential variable between the historically buffered variable and the first-type variable; and
encoding the first differential variable to obtain the compressed data.

6. The method according to claim 1, wherein the first-type variable comprises an object identifier of the associated virtual object; and
compressing the first-type variable to obtain compressed data comprises:
obtaining an object identifier of a preceding associated virtual object of the associated virtual object and obtaining a second differential variable between the object identifier of the associated virtual object and the object identifier of the preceding associated virtual object, the associated virtual object being in a successively processing relationship with the preceding associated virtual object; and
encoding the second differential variable to obtain the compressed data.

7. The method according to claim 1, wherein the first-type variable comprises historical path information; and
obtaining the first-type variable comprises:
obtaining a motion track of the associated virtual object within a target time range, determining motion location points of the associated virtual object based on the motion track, determining the motion location points as path information of the associated virtual object, and updating the historical path information in the first-type variable to the path information, the target time range referring to an interval of time for updating the path information in the first-type variable.

8. The method according to claim 1, wherein the method further comprises:
obtaining a historical full-quantity update time of the first-type variable of the associated virtual object and a second system network time;
encapsulating the first-type variable into full-quantity change data in response to a difference between the historical full-quantity update time and the second system network time being greater than or equal to a full-quantity update time threshold, and transmitting the full-quantity change data to the target client, so that the target client performs frame image update and display based on the full-quantity change data; or
compressing the first-type variable to obtain the compressed data in response to the difference between the historical full-quantity update time and the second system network time being less than the full-quantity update time threshold.

9. The method according to claim 1, wherein the method further comprises:
obtaining distance information between the main virtual object and at least two raw virtual objects from a distance relationship list;
obtaining a virtual object to be selected whose distance information is greater than a first distance threshold and less than or equal to a second distance threshold from the at least two raw virtual objects, and determining line-of-sight angle information between the virtual object to be selected and visual field direction information of the main virtual object; and
determining a raw virtual object whose distance information is less than or equal to the first distance threshold or a virtual object to be selected whose line-of-sight angle information is less than a visual angle threshold as the associated virtual object associated with the main virtual object.

10. The method according to claim 9, wherein the method further comprises:
obtaining a distance range of the distance information between each raw virtual object and the main virtual object and obtaining an update buffering time of each raw virtual object;
obtaining a list update time threshold corresponding to the distance range, and determining a raw virtual object of which a difference between the update buffering time and a third system network time is greater than or equal to the list update time threshold, among the at least two raw virtual objects, as a target virtual object; and
updating the distance information between the target virtual object and the main virtual object in the distance relationship list.

11. The method according to claim 1, wherein the method further comprises:
obtaining attribute categories of at least two raw virtual objects in an application scene, determining a raw virtual object whose attribute category is a user character attribute as a user virtual object, and determining a raw virtual object whose attribute category is a system character attribute as a system virtual object;
obtaining a group tag of the user virtual object, and determining another user virtual object whose group tag is the same as a group tag of the main virtual object as an associated user virtual object; and
determining the associated user virtual object and the system virtual object as the associated virtual objects associated with the main virtual object.

12. The method according to claim 1, wherein obtaining the first-type variable comprises:
obtaining a set of class objects corresponding to the main virtual object, the set of class objects comprising at least two subsets of object variables;
obtaining a subset of object variables corresponding to the associated virtual object from the at least two subsets of object variables of the set of class objects, the subset of object variables comprising a variable pertaining to the first update frequency type among the character variables of the associated virtual object; and
obtaining the first-type variable of the associated virtual object from the subset of object variables.

13. A data processing apparatus, the apparatus comprising:
a memory storing a plurality of instructions; and
a processor configured to execute the plurality of instructions, wherein the processor, upon execution of the plurality of instructions is configured to:

obtain an associated virtual object associated with a main virtual object and obtain a first-type variable belonging to a set of first-type variables among character variables of the associated virtual object, the set of first-type variables pertaining to a first update frequency for informing the first-type variable to a target client associated with the main virtual object;

compress the first-type variable to obtain compressed data;

encapsulate the compressed data to obtain first change data of the associated virtual object;

transmit the first change data of the associated virtual object to the target client at a first timing indicated by the first update frequency, so that the target client performs frame image update and display based on the first change data; and transmit at least a second-type variable among the character variables of the associated virtual object other than the set of first-type variables at a second timing different from the first timing.

14. The apparatus according to claim 13, wherein the processor, when executing the plurality of instructions to transmit at least the second-type variable, is configured to:

obtain the second-type variable in response to trigger information for the second-type variable of the associated virtual object being received, the second-type variable being a variable the associated virtual object, the second-type variable being a variable among pertaining to a second timing for updating the target client;

encapsulate the second-type variable into second change data of the associated virtual object; and transmit the second change data to the target client, so that the target client performs frame image update and display based on the second change data.

15. The apparatus according to claim 13, wherein the processor, when executing the plurality of instructions to transmit at least the second-type variable, is configured to:

obtain a historical update time of the second-type variable of the associated virtual object and a first system network time, the second-type variable being a variable among the character variables pertaining to the second timing for updating the target client;

encapsulate the second-type variable into third change data of the associated virtual object in response to a difference between the first system network time and the historical update time being greater than or equal to an update time threshold of the second-type variable; and transmit the third change data to the target client, so that the target client performs the frame image update and display based on the third change data.

16. The apparatus according to claim 13, wherein the first-type variable comprises location information, and wherein the processor, executing the plurality of instructions to compress the first-type variable, is configured to:

obtain the location information and a location accuracy of the associated virtual object; and convert the location information into integer location data based on the location accuracy and determine the integer location data as the compressed data.

17. The apparatus according to claim 13, wherein the process, when executing the plurality of instructions to compress the first-type variable, is configured to:

obtain the first-type variable from a frame to be updated, and obtain a historically buffered variable corresponding to the first-type variable from a historical frame where the main virtual object is located, the historical frame being a previous frame of the frame to be updated;

obtain a first differential variable between the historically buffered variable and the first-type variable; and encode the first differential variable to obtain the compressed data.

18. The apparatus according to claim 13, wherein the first-type variable comprises an object identifier of the associated virtual object, and wherein the processor, when executing the plurality of instructions to compress the first-type variable, is configured to:

obtain an object identifier of a preceding associated virtual object of the associated virtual object and obtain a second differential variable between the object identifier of the associated virtual object and the object identifier of the preceding associated virtual object, the associated virtual object being in a successively processing relationship with the preceding associated virtual object; and encode the second differential variable to obtain the compressed data.

19. A non-transitory computer-readable storage medium, storing a plurality of program instructions, the plurality of program instructions, when executed by a processor, is configured to cause the processor to:

obtain an associated virtual object associated with a main virtual object and obtain a first-type variable belonging to a set of first-type variables among character variables of the associated virtual object, the set of first-type variables pertaining to a first update frequency for informing the first-type variable to a target client associated with the main virtual object;

compress the first-type variable to obtain compressed data;

encapsulate the compressed data to obtain first change data of the associated virtual object;

transmit the first change data of the main virtual object to the target client at a first timing indicated by the first update frequency, so that the target client performs frame image update and display based on the first change data; and transmit at least a second-type variable among the character variables of the associated virtual object other than the set of first-type variables at a second timing different from the first timing.

20. The non-transitory computer-readable storage medium of claim 19, wherein the plurality of program instructions, when executed by the processor to transmit at least the second-type variable, are configured to cause the processor to:

obtain the second-type variable in response to trigger information for the second-type variable of the associated virtual object being received, the second-type variable being a variable among the character variables pertaining to the second timing for updating the target client;

encapsulate the second-type variable into second change data of the associated virtual object; and transmit the second change data to the target client, so that the target client performs frame image update and display based on the second change data.

* * * * *